United States Patent
Smith

(10) Patent No.: US 11,146,687 B2
(45) Date of Patent: Oct. 12, 2021

(54) HARMONISING TELEPHONY CONVERSATIONS INVOLVING EMBEDDED DEVICES AND SOCIAL MEDIA APPLICATIONS

(71) Applicant: RingCentral, Inc., Belmont, CA (US)

(72) Inventor: James Smith, Nottinghamshire (GB)

(73) Assignee: RingCentral, Inc., Belmont, CA (US)

( * ) Notice: Subject to any disclaimer, the term of this patent is extended or adjusted under 35 U.S.C. 154(b) by 368 days.

(21) Appl. No.: 16/084,139

(22) PCT Filed: Mar. 8, 2017

(86) PCT No.: PCT/EP2017/055415
§ 371 (c)(1),
(2) Date: Sep. 11, 2018

(87) PCT Pub. No.: WO2017/153457
PCT Pub. Date: Sep. 14, 2017

(65) Prior Publication Data
US 2020/0296144 A1    Sep. 17, 2020

(30) Foreign Application Priority Data

Mar. 11, 2016 (DE) .......................... 102016003053.4
Jul. 11, 2016 (DE) .......................... 102016112685.3

(51) Int. Cl.
*H04M 3/54* (2006.01)
*H04M 7/00* (2006.01)
(Continued)

(52) U.S. Cl.
CPC ............. *H04M 3/54* (2013.01); *G06Q 10/10* (2013.01); *G06Q 10/107* (2013.01); *G06Q 50/01* (2013.01);
(Continued)

(58) Field of Classification Search
None
See application file for complete search history.

(56) References Cited

U.S. PATENT DOCUMENTS 4,109,113 A    8/1978  Allison, Jr. et al.
9,171,284 B2 * 10/2015 Gupta .................... G06Q 10/10
(Continued)

FOREIGN PATENT DOCUMENTS

CN    101188634 A    5/2008
CN    103546435 A    1/2014
(Continued)

OTHER PUBLICATIONS

Aditya, C., "DRUPE App Review, Unique Contacts App!", Apr. 7, 2015, URL:https://www.youtube.com/watch?=myBAPhecMAU.
(Continued)

*Primary Examiner* — Otis L Thompson, Jr.
(74) *Attorney, Agent, or Firm* — Finnegan, Henderson, Farabow, Garrett & Dunner, LLP

(57) ABSTRACT

It is disclosed a method to operate a desktop telephone (400) with Internet Protocol (IP) connectivity in a business social real-time collaboration environment, i.e. using the desktop telephone (400) as terminating point for incoming and outgoing calls or conferences capabilities where the desktop telephone may be located on a desktop or other surface or be wall mounted, with a list of recent calls, contacts (323) and directory search results altogether made available as a single combined conversation list (303) for navigation and for activation for a business social real-time collaboration user, such that the desktop telephone (400) is always up-to-date with the user's social real-time collaboration system; wherein when the said user logs on to his/her social real-time collaboration account the desktop telephone (400) associ-
(Continued)

ated with said user is in synchronisation with his/her activities involved with the social real-time collaboration system.

21 Claims, 13 Drawing Sheets

(51) Int. Cl.
    *G06Q 10/10* (2012.01)
    *G06Q 50/00* (2012.01)
    *H04M 3/00* (2006.01)
    *H04L 29/06* (2006.01)
    *H04W 4/14* (2009.01)

(52) U.S. Cl.
    CPC ........ *H04L 65/1069* (2013.01); *H04L 65/403* (2013.01); *H04L 65/4015* (2013.01); *H04M 3/00* (2013.01); *H04M 7/0027* (2013.01); *H04M 2201/14* (2013.01); *H04M 2203/6081* (2013.01); *H04W 4/14* (2013.01)

(56) References Cited

U.S. PATENT DOCUMENTS

| | | | | |
|---|---|---|---|---|
| 10,147,427 | B1* | 12/2018 | Johnson | G10L 15/1815 |
| 2009/0086720 | A1* | 4/2009 | Westlake | H04L 12/66 |
| | | | | 370/352 |
| 2010/0008480 | A1* | 1/2010 | Sheridan | H04L 65/1006 |
| | | | | 379/90.01 |
| 2012/0094647 | A1 | 4/2012 | Aftab et al. | |
| 2012/0124466 | A1* | 5/2012 | Sinn | G06Q 30/02 |
| | | | | 715/255 |
| 2017/0019368 | A1* | 1/2017 | Swink | H04W 4/14 |
| 2017/0374514 | A1* | 12/2017 | Biswas | H04W 4/12 |
| 2019/0325117 | A1* | 10/2019 | Li | H04N 7/147 |
| 2019/0372961 | A1* | 12/2019 | Circosta | H04L 9/0894 |

FOREIGN PATENT DOCUMENTS

| | | |
|---|---|---|
| WO | 2013028325 A2 | 2/2013 |
| WO | 2014209666 A1 | 12/2014 |
| WO | WO 2014/209666 A1 | 12/2014 |

OTHER PUBLICATIONS

International Search Report for PCT/EP2017/055415 filed Mar. 8, 2017, dated May 4, 2017.

Chinese Office Action issued by the State Intellectual Property Office (SIPO) of the People's Republic of China dated Jun. 4, 2021, in counterpart Chinese Application No. 201780028838.3.

* cited by examiner

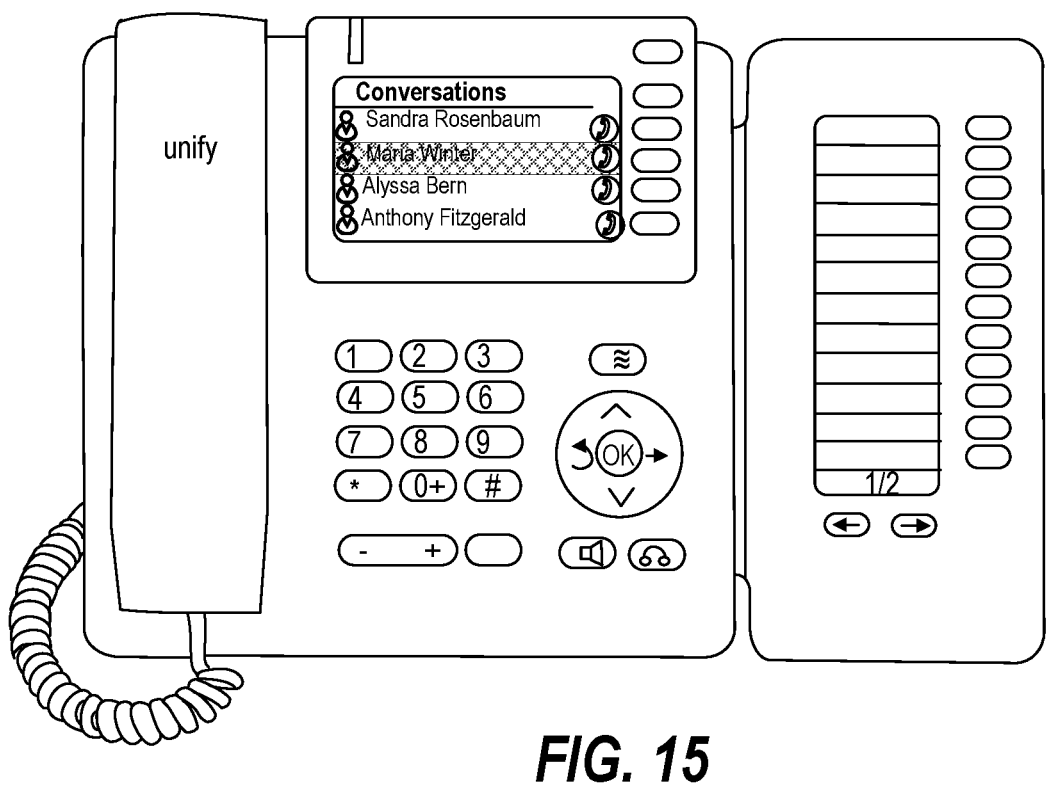
FIG. 15
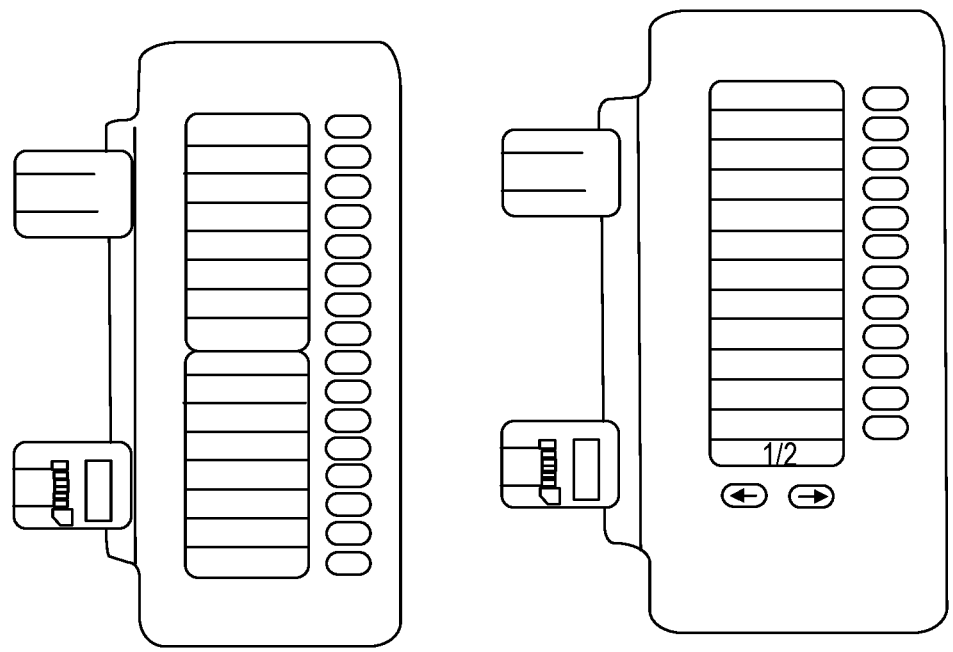
FIG. 16     FIG. 17

HARMONISING TELEPHONY CONVERSATIONS INVOLVING EMBEDDED DEVICES AND SOCIAL MEDIA APPLICATIONS

TECHNICAL FIELD

The present invention relates to a telecommunication system and a corresponding method, supporting real-time communications for social media applications.

BACKGROUND OF THE INVENTION

Today's social media applications support real-time communications (e.g. telephone calls) between other users of the application and some with external parties.

In WO 2014/209666 A1 there is disclosed a method and an apparatus for providing conversation history from multiple communication channels by aggregating conversation history comprising collecting one or more communications from one or more communication channels, associating related communications from the one or more communications with each other using a matching algorithm into one or more conversations and presenting an aggregation of the one or more conversations to a user as a conversation history.

In the prior art document WO 2013/028325 A2 there is disclosed a unified messaging system with integration of call log data which is further explained in the description below.

ADVANTAGES OF THE INVENTION OVER THE PRIOR ART

Today's social media applications support real-time communication (e.g. telephone calls) between other users of the application and with some external parties. A user of such an application may have an embedded telephone device (e.g. a desk phone) that they wish to use in a similar manner to the social media application and thus desire a coherent interface that applies to all the devices that they could use for real-time communication.

The problem for this invention is that the prior art cannot connect an embedded device as a client to the social media application so that they can use the embedded device for telephone calls as an alternative to the applications real-time communication capability or move calls between their social media application client and the embedded telephone device. In addition the prior art cannot use the embedded telephone device to establish an independent audio connection to a participant or conference group that is currently active via their social media application client even if the social media application conversation is also using audio but preferably with their microphones muted or automatically muted.

SUMMARY OF THE INVENTION

The purpose of this invention is to provide a unified means to visualise communication activity on, an embedded device such as a desktop telephone that is consistent with that used by a social media application. For this the traditional phone book list of contacts and the call log list of call history are unified into a single conversation list by the embedded device. A particular benefit of this is that the history of the user's social media communication can also be incorporated into the conversation list so that the user's call and media activity is visible from the same device. A further benefit that an embedded device such as a desktop telephone brings is the ease with which a call can be made from a highlighted entry; just by picking up the handset or pressing a single key. Further major benefits of an embedded device such as a desktop telephone are that it is always on, immediately available and has consistent high quality audio capability. Further it can be understood that audio provided by a media application can be disrupted by various sources based on the client used whilst a telephone call is recognised as being far less subject to disruptions and will normally be prioritised within the IP communication cloud.

Moreover, contact information from multiple sources plus all call history information for a specific contact is combined into a single record per call party that is in or has been in a call with the user whether this was via their embedded device or via their social media application. All such records are displayed on the embedded device, typically in a time ordered list so that there is one item per contact with the most recent calls at the top. In addition the social media application may include items that record non-real time communication (e.g. messaging) as history items in a conversation.

The problem is solved by a telecommunication system according to claim 1 and by a method according to claim 2, said telecommunication system supporting real-time communications for social media applications, comprising an IP communication cloud, a telephony server, a Lightweight Directory Access Protocol (LDAP) server, an exchange server, a media application and an embedded device being incorporated in a multimedia telecommunication device, preferably a personal computer (PC), a multimedia desktop telephone or a smart telephone, the embedded device comprising an conversation builder, an aggregator, contacts of a contact directory, a call history and a conversation list; wherein the operations on one embedded device is synchronized via the IP communication cloud with the operations on any other devices, e.g. phones or multimedia application devices of the same user; and wherein the conversation list combining telephone conversations, video conversations and messages of an exchange server.

THE INVENTION HAS THE FOLLOWING ADVANTAGES OVER THE PRIOR ART (1) Provides aggregation within the desktop telephone rather than a social media application.
(2) Creates a conversation entry that relates a contact to all its accessible communication history which may be independent of a social media application or may incorporate social media events.
(3) Allows for several sources of contacts to be searched to find the contact that best matches a call.
(4) Makes it easy to initiate a call to a number obtained from a social media application by using the innate features of a desktop telephone.

BRIEF DESCRIPTION OF THE DRAWINGS

FIG. 15 illustrates a top view on the OpenScape Desk Phone CP600 extended with a Key Module as described on page 29 of Annex 1.

FIG. 16 illustrates a top view on the Key Module KM400 as described on page 29 of Annex 1.

FIG. 17 illustrates a top view on the Key Module KM600 as described on page 29 of Annex 1.

DETAILED DESCRIPTION OF EXAMPLE EMBODIMENTS OF THE INVENTION

Figure 1:
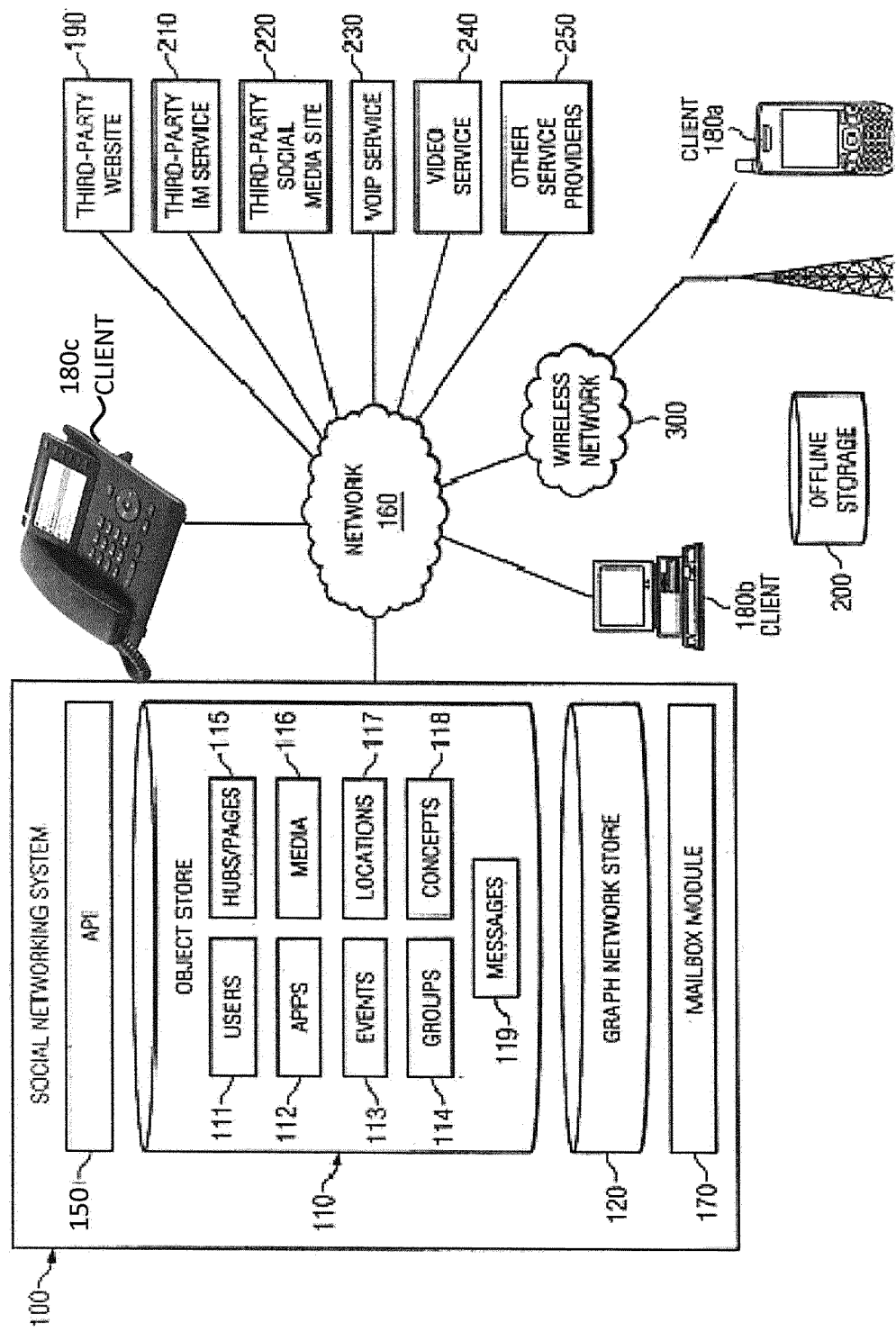
FIG. 1 illustrates a high-level block diagram of an integrated messaging system as partly known from WO 2013/028325 A2 being explained in the description corresponding to FIG. 1 of WO 2013/028325 A2 with corresponding reference signs, which is used for explaining the principle of the present invention.

FIG. 1 illustrates an example of a social networking environment on the basis of a high-level block diagram of an integrated messaging system as can be used for the present invention, comprising a social networking system 100, client devices 180a and 180b, wireless cellular network 300, third-party website 190, service providers (e.g. third-party IM service 210, third-party social media site 220, VoIP service 230, Video Service 240, and other third-party services providers 250.) FIG. 1 also includes offline storage 200 that is local to client devices 180a which connects to network 160 through a wireless (cellular) network 300, and client device 180b. Client devices 180a and 180b are depicted as a mobile phone 180a and desktop computer 180b, but client devices 180 may comprise any type of computing device, including mobile phone, laptop, notebook tablet, cable box, television, etc. Client devices 180a and 180b have memories capable of storing call, text, and other messaging data, depicted in FIG. 1 as offline storage 200.

Client devices 180a and 180b interact with external websites 190 and other service providers 210 (e.g. Google Chat), 220 (e.g. Twitter), 230 (e.g. Skype), 240 (e.g. FaceTime or Tango), and any type of 250 which is connected to network 160 (e.g. e-mail servers, other social-networking websites, shopping sites, review sites) by visiting and logging into their mail account via a web browser residing on the client device, or by installing and running a dedicated application local to client devices 180a and 180b. A user of the client devices 180a and 180b interacts with the social networking system 100 via an application, such as a web browser or a native application, to perform operations such as browsing content, posting and sending messages, retrieving and sorting messages in any electronic message format (e.g. e-mail, chat, SMS) received from other users, and the like. Messages can contain plain text, or they can contain other content such as pictures, videos, and attachments. Each user has a mailbox that includes messages that are both sent and received by the user. Client device 180a, connected through wireless network 300, may also interact with other client devices through the circuit-switched, or non-data, portion of wireless network 300. For example, a user at client device 180a may transmit and receive a non-VoIP call to a cellular phone or landline, transmit and receive a text or multimedia message through the SMS or MMS channels, or receive push notifications through the SMS control channel.

Additionally, the third party website 190 can also interact with the social networking system 100 via a system-provided API 150, whereby API stands for Application Programming Interface. For example, the third party website can perform operations supported by the Application Programming Interface (API), such as delivering messages to the social network system 100, retrieving messages stored by the social networking system 100, and obtaining social information about users of the social networking system 100.

The social networking system 100 comprises an API 150, an object store 110, a graph network store 120, and a mailbox module 170. The object store 110 stores information on objects, such as users 111, apps 112, events 113, groups 114, hubs/pages 115, media 116, locations 117, concepts 118 or messages 119, represented in or by the social networking environment 100. The graph network store 120 stores information on the relationships of the objects in the object store 110. The mailbox module 170 provides functionality for powering the messaging system.

The mailbox module 170 receives, organizes, stores and presents (all data-related) messages and/or communications which may be aggregated by client push and/or server pulls or pulled automatically through one or more APIs 150 to/from users in the social networking system 100 via an interactive user interface, such as a webpage that is viewed by a user with a web browser, an application residing on the user's computing device 180*a* or 180*b* or a combination of server and client side rendering. In particular embodiments, a local application on client devices 180*a* and 180*b* may perform the operations of mailbox module 170 and pulls data from social network system 100 and third-party entities 190 and 210-250 to mobile device 180.

FIG. 1 of the present application is partly taken from FIG. 1 of the prior art document WO 2013/028325 A2 illustrating a level block diagram of a known integrated messaging system with network components having the same reference signs as shown and described in the description part from page 2, line 19 to page 4, line 29 of this prior art document WO 2013/028325 A2 which is repeated above in the "detailed description of example embodiments of the invention".

In addition there is added as further client, a client desktop telephone 180*c* (e.g. such as the IP-telephone "OpenScape Desk Phone CP600" with the "OpenScape key module 600" on the side (disclosed in documents [1] to [5] including Annexes 1 to 3 of Unify Software and Solutions GmbH & Co. KG, Mies-van-der-Rohe-Str. 6, D-80807 München, Germany in the reference list below and incorporated by reference into the disclosure) connected to the network 160 to the FIG. 1 of the drawings of the present invention, which is not disclosed in WO 2013/028325 A2.

Figure 2:
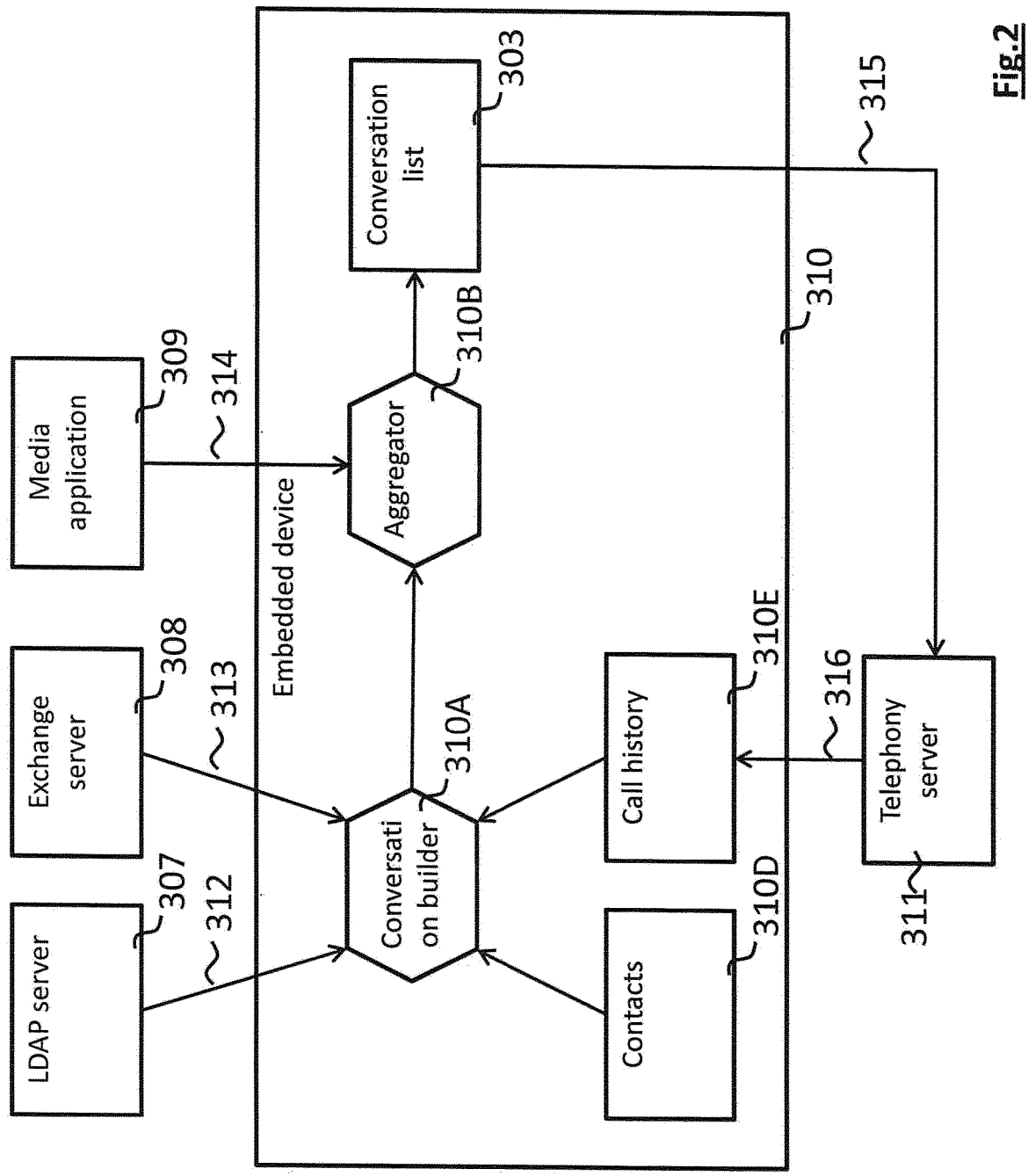
FIG. 2 shows a block diagram of a first example embodiment of the invention.

In a first example embodiment of the present invention shown in FIG. 2 the user receives an incoming telephone call 316 from a Telephony server 311 on its embedded device 310. The call is noted in the Call history 310E and the Conversation builder 310A is notified. The Conversation builder 310A matches the caller's number to one of the numbers for a contact stored within the device 310D. The number matching may work by checking all the numbers of each contact in turn. Alternatively the number matching may working by preferring a particular type of number (e.g. the main or work number) and attempting to find a match to this type of number in each contact before following the same procedure with the next preferred number type. Where multiple contacts may be matched then the most recently used contact is selected. This may be achieved by searching the contacts in the order that they were last used in a conversation. This may be refined further so that contacts last called by the embedded device 310 are searched before contacts that last received a call followed by contacts that had not yet been involved in a call based in the order of when created (latest contact searched first).

Conversation builder 310A creates a conversation item 302 for the call with the contact by combining the call history for the call 316 with the Contact 301 matched.

The conversation item 302 is passed to the Aggregator 310B that merges the conversation item into the Conversation list 303 that is displayed to the device user.

The Aggregator 310B searches for a conversation item 302 in the conversation list 303 that is already associated with the matched contact. If a matching conversation is found then the call history in the conversation provided by the Conversation builder 310A is extracted and added to the History record 304 of the existing conversation and the conversation items is displayed at the top of the Conversation list 303. If a matching conversation cannot be found then the conversation item 302 provided by the Conversation builder 310A is added to the top of the Conversation list 303 for display to the user.

As a further enhancement the embedded device 310 may pass the newly created/updated conversation item 302 back to the media application 309 where it becomes visible by a client of the same user that is connected to the media application 309 as well as all other media application 309 participants in the conversation. Alternatively the media application 309 may independently detect and record the call at the embedded device 310 without further information from the device.

A modified example is where the Conversation builder 310A is not able to match a contact stored within the embedded device 310D but does match to a contact 313 provided by the user's Exchange server 308 account such as an account of a Microsoft Exchange server. Alternatively the Conversation builder 310A is not able to match a contact stored within the device 310D nor does it match to a contact 313 provided by the user's Exchange server 308 account but it does match to a contact 312 found by the LDAP server 307. LDAP stands for Lightweight Directory Access Protocol. If the Conversation builder 310A is not able to find any matching contact then it may create a contact based on the information provided in the call 316 by the Telephony server 311.

In another example of this invention the user selects a conversation from their Conversation list 303 and initiates an outgoing call 315 using one of the telephone numbers provided by the contact part of the conversation by going off-hook with a desktop telephone handset or by pressing a single key on the phone body. The number selected may correspond to a single individual or to a conference bridge. Alternatively the user selects a conversation from their Conversation list 303 and browses the call history associated with the conversation item for previous calls and social media communication with the contact.

A variant of this embodiment is where the user initiates an outgoing call independently of a conversation item (e.g. by dialling or from a stored number). The Telephony server 311 informs the embedded device 310 about the party dialled and the party or parties subsequently connected to. This information is used to update the Conversation list in a manner consistent with that described earlier for incoming calls. Where two different target parties are involved in the call (dialled party and connected party) then two different conversation items 314 are updated. Similarly, if a call feature changes a party in the call then the conversation item 314 that matches the subsequent party is updated. If a call feature adds a party to an on-going call (i.e. via a conference bridge) then the existing conversation item may be updated to link to the contact for the party added or a new conversation may be created.

In another example of this invention the media application 309 provides a new or updated conversation item 314 resulting from user activity within the Media application. For example the user may have sent or received a non-audio message with another Media application user or may have been involved in an audio or video call using their Media application 309. The conversation item is passed to the Aggregator that merges the conversation item into the Conversation list 303 that is displayed to the user device. The conversation entry displayed to the user may be able to provide part or all of the first line in the message as a 'teaser' 327 & 328 to the user. The user may decide to use their media application client 309 to continue their interaction with the conversation.

Another embodiment allows the user to use their embedded device 310 in collaboration with their media application client 309. One example is where the user is involved in a non-audio conversation via their media application client 309. This conversation will also appear at the top of the conversation list of the embedded device 310 since it is the most recent conversation item. The user may now initiate a telephone call to the peer Media application user from the conversation list on their embedded device 310 by simply picking up the handset or pressing a single button to start a call to the telephone number associated with the conversation (which may be a number to call an individual or the number of a conference bridge). The user may continue their non-audio conversation via their Media application client whilst simultaneously holding an audio conversation via their embedded device 310. The existing conversation item is updated to record the new call history item (as described earlier) and the updated conversation item may be shared with the Media application (also described earlier). An alternative example is when the user is involved in an audio call via their embedded device 310. As previously described the conversation item for the telephone call may have been presented to the user's Media application and be visible via their Media application client. This allows the user to start a non-audio conversation via their Media application client whilst simultaneously holding an audio conversation via their embedded device 310.

A further example is where the user is involved in a conversation via their Media application client 309 that involves an audio being used. The user may elect to push the audio to their embedded device 310 to continue the audio component of the conversation using that device (e.g. a user with a mobile Media application client returns to their desk). The pushed audio is presented as a new call at their embedded device 310 which may be answered by going off-hook with the device's handset or by pressing a single button on the embedded device 310. The call history for this new call will be integrated into the existing conversation item shown for the Media application conversation on the embedded device 310 as well as on the Media application client (as described earlier).

As an alternative the user may pull the audio from the Media application client to their embedded device 310 by interacting with the conversation item shown for the Media application conversation on the embedded device 310. This may be realised as a request being sent by the embedded device 310 to the Media application client to push the call to the embedded device 310.

A further embodiment allows the user to hold a side conversation with a participant in a group conversation being conducted via their Media application client 309. The user may select a specific user from the conversation item shown for the Media application conversation on the embedded device 310 and initiate a telephone call to this user via their embedded device 310. The telephone call may be in addition to audio already being used by their client in the Media application conversation (the user would normally mute, or otherwise disable, their audio in the Media application client). This may create a new conversation item at the embedded device 310 and the user may elect to share this side conversation with the Media application (and so be seen by all the participants of the conversation) or they may elect to keep it private and only record it at their embedded device 310. Alternatively the side conversation may be recorded as an additional call history item in the conversation item.

Figure 3:
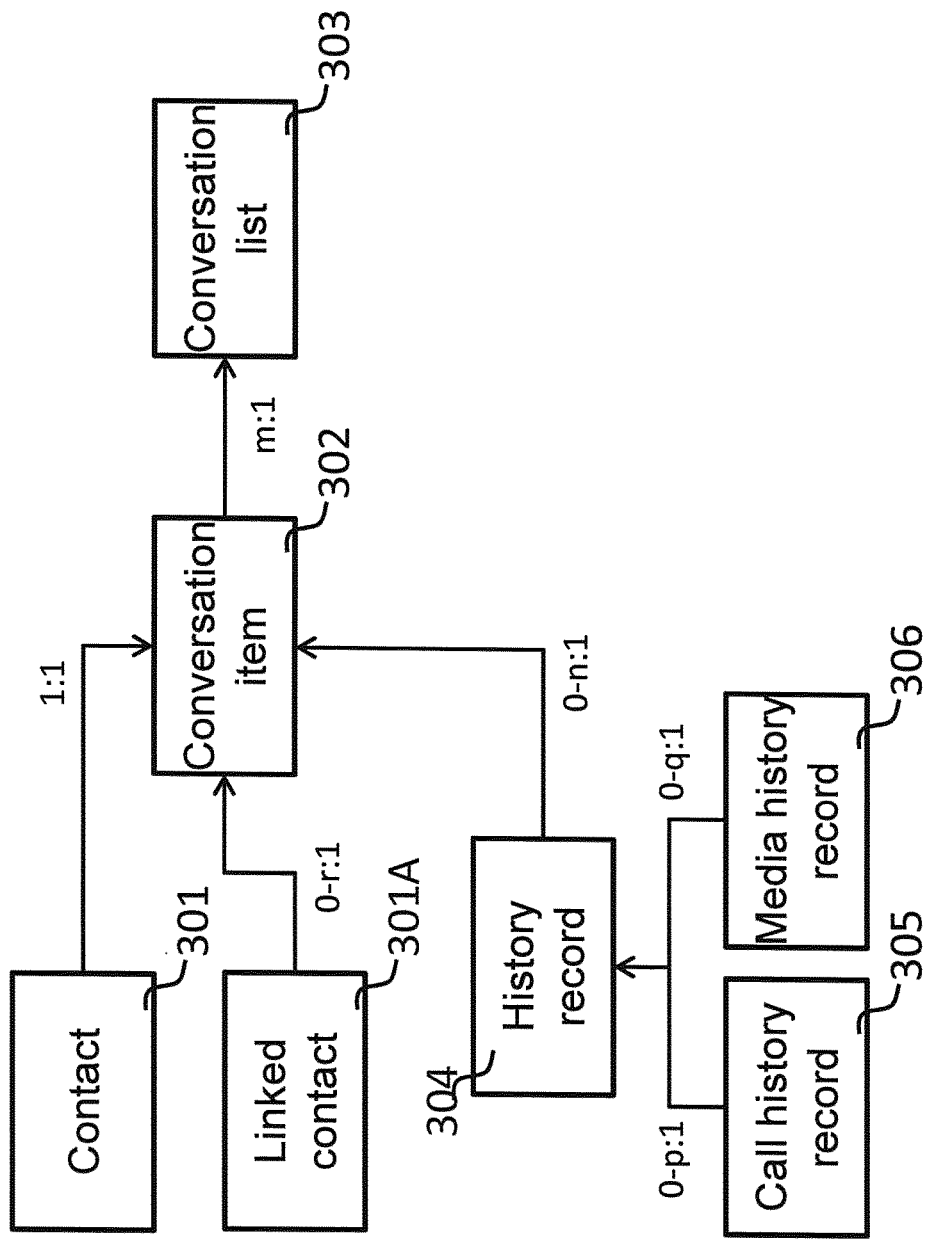
FIG. 3 shows a block diagram of the structure of an example embodiment of a conversation list as incorporated in the first example embodiment of FIG. 2 according to the invention.

FIG. 3 illustrates that a Conversation list 303 is composed of a plurality of Conversation items 302 where each Conversation item 302 comprises a single Contact 301 and may also include a plurality of History records 304 which itself may contain a plurality of Call history records 305 and/or a plurality of Media history records 306. It should be noted that a Conversation item 302 without any associated History records 304 corresponds to a traditional Phone Book entry. As a further enhancement a Conversation item 302 may represent a group of participants by linking one or more contacts 301A where the primary Contact 301 now provides the pilot number (e.g. conference bridge) to access the group.

FIG. 2 illustrates the main components in an example embodiment of the system. An Embedded device 310, such as a desktop telephone, displays a Conversation list 303 to its user where the list is composed of conversation items that are ordered based upon their time of last use or time of creation if they had not been used for calls. Each conversation item is comprised of a single contact plus a plurality of call history records where the contact had been identified as being a peer party in a call. Each conversation item in the Conversation list 303 allows the user to make an outgoing call 315 to one of the telephone numbers associated with the contact via the Telephony server 311. When the Telephony server 311 notifies the Embedded device 310 about a call 316 for the user a new record in the Call history 310E is created for a new call. The Conversation builder 310A is notified about the new record in the Call history 310E and the Conversation builder 310A tries to find a contact to match the peer party in the call.

The Conversation builder 310A checks for an existing contact in the database of Contacts 310D, and then it checks for a matching contact 313 from the user's account on an Exchange server 308 or a matching contact 312 from the LDAP server 307. If the Conversation builder 310A cannot match to a contact from any of the contact sources 310D, 308 or 307 then it creates a new contact using information provided by the Telephony server 311 for the peer party in the call and adds this to the database on Contacts 310D. The Conversation builder 310A looks for an existing conversation item in the Conversation list 303 that matches the contact. If such a conversation item exists then the Conversation builder 310A updates the conversation with the new Call history 310E record otherwise the Conversation builder 310A creates a new conversation using the matched contact and the new Call history 310E record. If a Call history 310E record already exists for the call then this will be updated in the Call history 310E for a change of state of the call and the Conversation builder 310A updates a previously created conversation item.

The Aggregator 310B updates the Conversation list 303 for the conversation provided by the Conversation builder 310A such that the Conversation list 303 displays conversations in the currently specified order (normally the most recent conversation is at the top), If a conversation for the contact already exists in the Conversation list 303 then the Aggregator 310B updates the existing conversation for the new or revised Call history 310E record. In addition to the Conversation builder 310A the Media application 309 may also be a source of conversation items 314 to the embedded device 310. The Aggregator 310B may integrate conversations from both sources to create the Conversation list 303. Where contact part of a conversation 314 from the Media application 309 also matches the peer party for a call 316 then the Aggregator 310B will integrate media history with the call history in the conversation list 303.

Some examples for the operation of the embedded device 310 are described below:
- (a) The user receives an incoming telephone call 316 from the telephony on their embedded device 310. The call is noted in the Call history 310E and the Conversation builder 310A is notified. The Conversation builder 310A matches the caller to a contact stored in the contacts 310D within the embedded device 310D and provides a conversation item 302 for the call with the contact. The conversation item 302 is passed to the Aggregator 310B that merges the conversation item 302 into the Conversation list 303 that is displayed to the user of the embedded device 310.
- (b) Same as example (a) except that the Conversation builder 310A is not able to match a contact stored in the contacts 310D within the embedded device 310 but does match to a contact 313 provided by the user's Exchange server 308 account.
- (c) Same as example (a) except that the Conversation builder 310A is not able to match a contact stored in the contacts 310D within the embedded device 310 nor does it match to a contact 313 provided by the user's Exchange server 308 account but it does match to a contact 312 found by the LDAP server 307.
- (d) The user selects a conversation item 302 from their Conversation list 303 and initiates an outgoing call 315 using one of the telephone numbers provided by the contact part 301 of the conversation item 302.
- (e) The user selects a conversation item 302 from their Conversation list 303 and browses the call history records 305 for previous calls and social media communication with the contact 301.
- (f) The Media application 309 provides a new or updated conversation item 314 resulting from user activity within the Media application 309. For example the user may have sent or received a message to another Media application user or may have been involved in an audio or video call using their Media application 309. The conversation item 314 is passed to the Aggregator 310B that merges the conversation item 314 into the conversation list 303 that is displayed to the user of the embedded device 310.

Figure 4A:
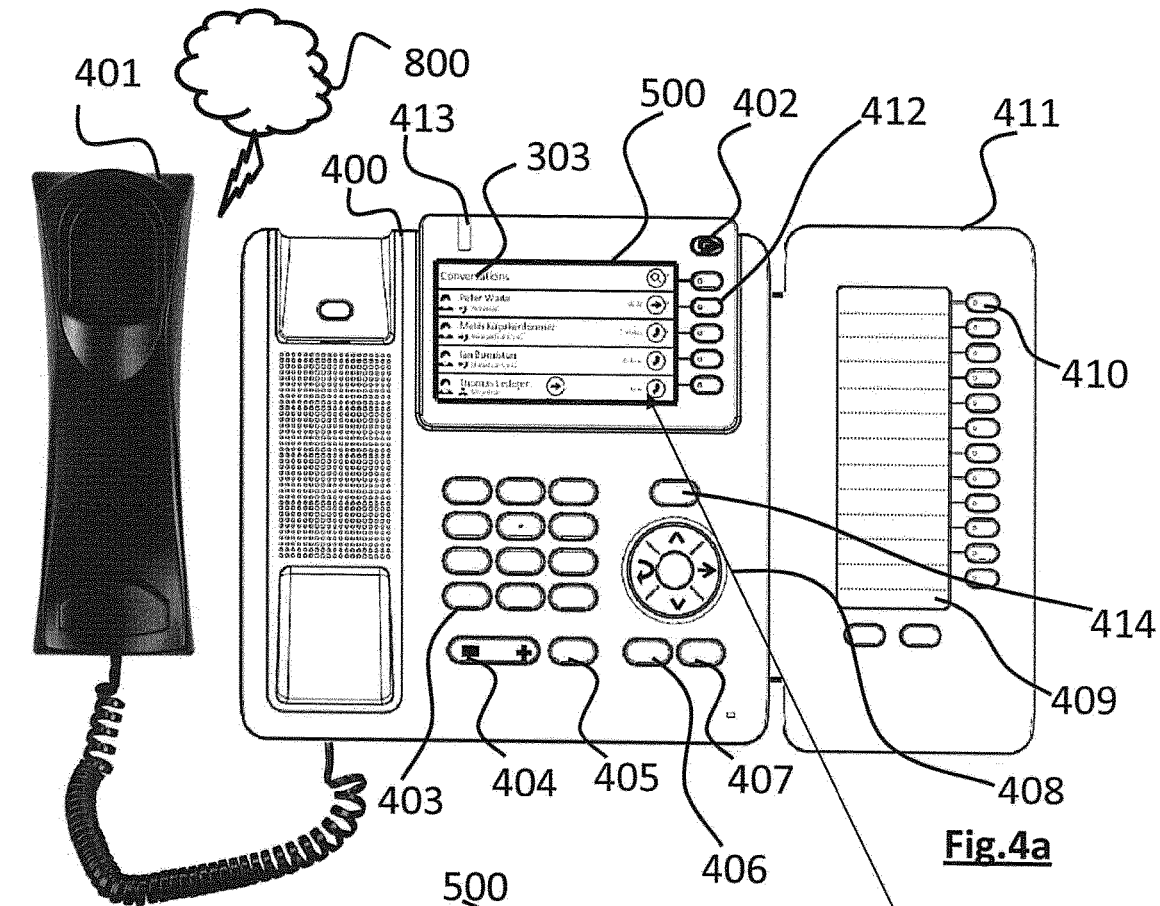
FIG. 4a illustrates a multimedia desktop telephone incorporating a second example embodiment of the invention showing on its display a first conversation list according to an example embodiment of the invention.

FIG. 4a illustrates a multimedia desktop telephone 400 which is based on the OpenScape Desk Phone CP600 as disclosed in documents [1] to [5] including Annexes 1 to 3 of Unify Software and Solutions GmbH & Co. KG, Mies-van-der-Rohe-Str. 6, D-80807 München, Germany with a telephone receiver (handset) 401 and a key module 411 with a telephone directory 409 to select and dial a contact thereof 410; incorporating a second example embodiment of the invention showing on its display 500 a first conversation list 303 according to an example embodiment of the invention. Below the display 500 there is the alphanumerical telephone keypad 403 and further below a volume button 404, mute button 405, a loudspeaker button 406, a headset button 407 and a navigation control wheel 408 for selecting one of the five lines of the telephone display 500.

Within the wheel 408 there are four segments marked with arrows up and down as well to the right for navigation between the lines and within a line of the telephone display 500. The fourth arrow shows a return button.

For operation of the multimedia desktop telephone 400 it is noted that when the telephone receiver 401 is taken off-hook, then the contact/conversation on top of the list is selected and can be dialled directly with the select button on top of the direct select buttons 412 which are short cut keys for the pictograms as marked as action 320. Alternatively can be used for a direct dialling the pictograms as marked as action 320. With the navigation control wheel 408 it is possible to navigate the focus within each displayed line and to select and execute the corresponding function by pressing the button in the middle of the navigation control wheel 408.

Figure 5A:
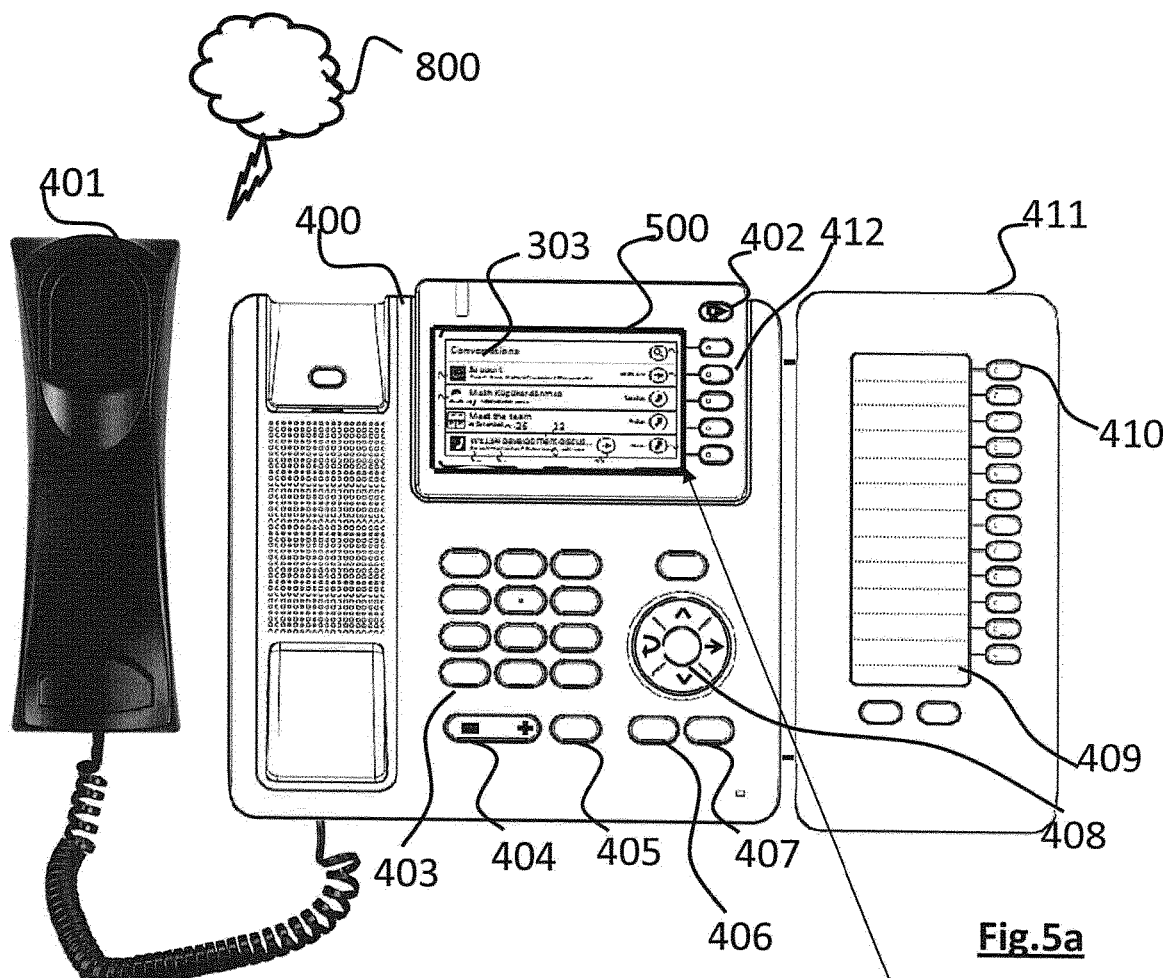
FIG. 5a illustrates the multimedia desktop telephone incorporating the second example embodiment of the invention according to FIG. 4a, however showing on its display a second conversation list according to an example embodiment of the invention.
Figure 7A:
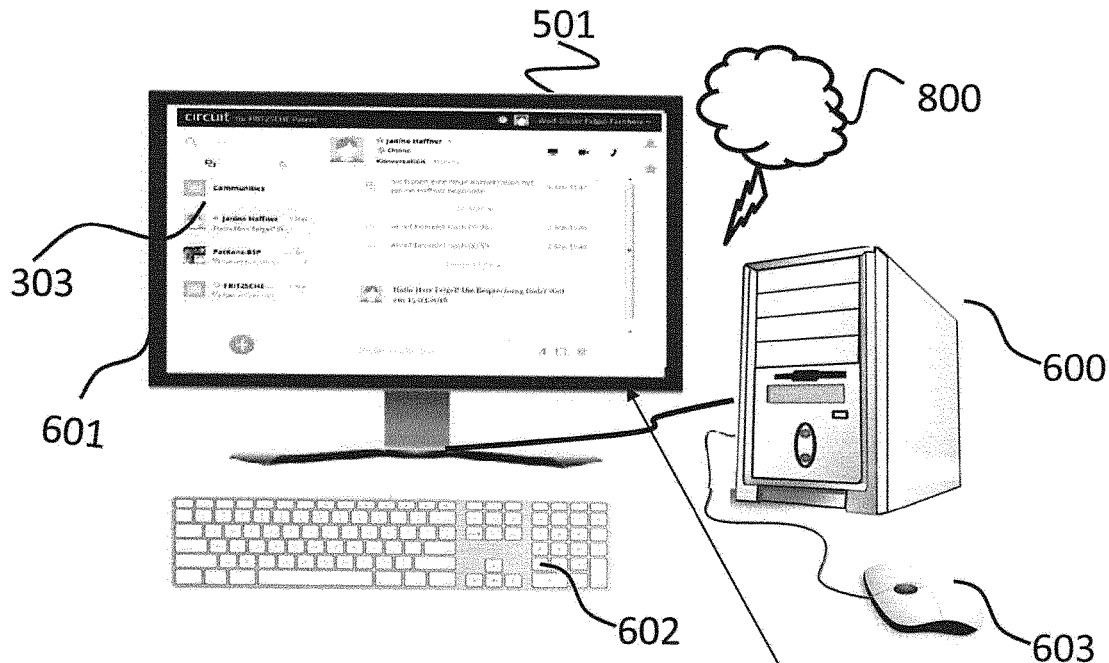
FIG. 7a illustrates a multimedia personal computer (PC) incorporating a third example embodiment of the invention showing a third conversation list on its display according to an example embodiment of the invention.
Figure 8A:
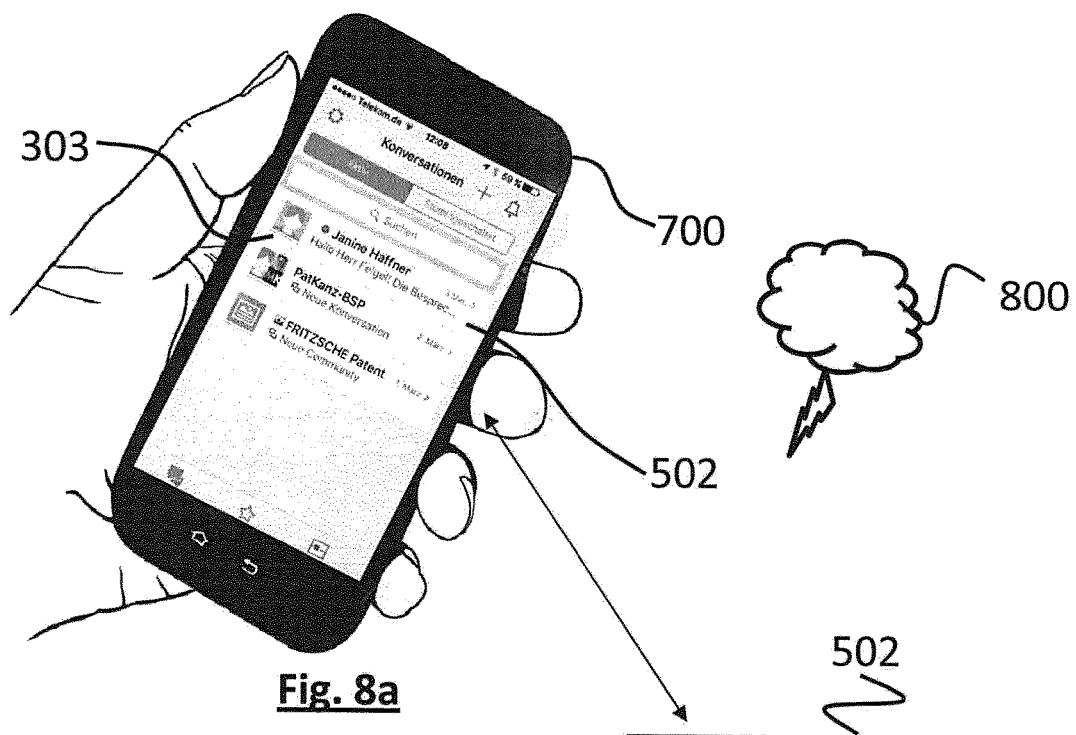
FIG. 8a illustrates a multimedia handheld mobile telephone incorporating a fourth example embodiment of the invention showing a fourth conversation list on its display according to an example embodiment of the invention.
Figure 9A:
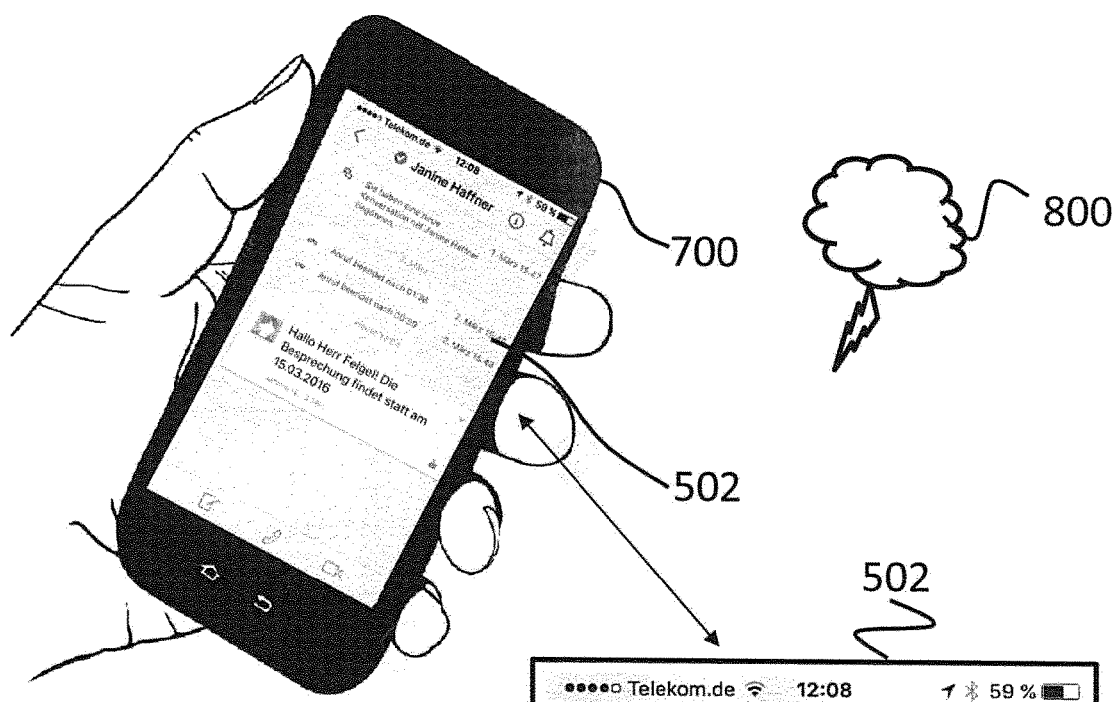
FIG. 9a illustrates the multimedia handheld mobile of FIG. 8a incorporating the fourth example embodiment of the invention showing on its display a fifth conversation list according to an example embodiment of the invention.

The multimedia desktop telephone 400 is connected via a not shown IP communication network with an IP communication cloud 800. All the operation on this multimedia desktop telephone is synchronized with a not shown database in the IP communication cloud 800 and with all other embedded devices 310 as incorporated in the multimedia desktop telephone 400 as shown in FIG. 4a and FIG. 5a and as incorporated in the personal computer (PC) 600 as shown in FIG. 7a and as incorporated in the mobile phone 700 as shown in FIG. 8a and FIG. 9a.

Figure 4B:
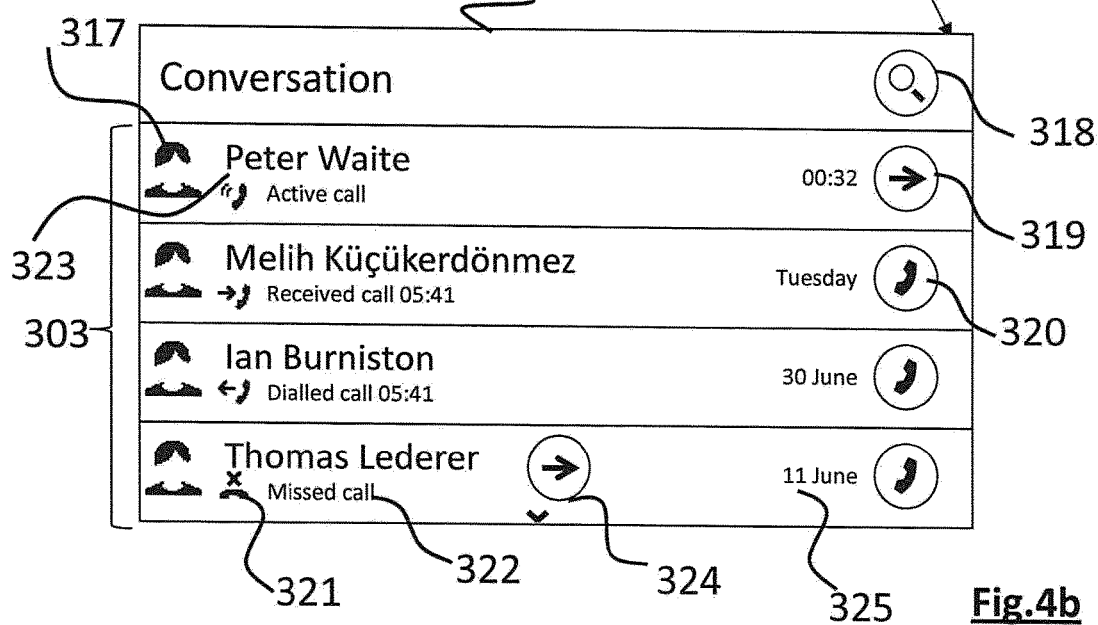
FIG. 4b illustrates the display of the multimedia desktop telephone of FIG. 4a incorporating the second example embodiment of the invention in an enlarged scale showing the first conversation list according to an embodiment of the invention.

FIG. 4b illustrates the display 500 of the multimedia desktop telephone 400 of FIG. 4a in an enlarged scale showing the first conversation list 303 comprising the history of telephone calls. With one of the five select buttons 412 the corresponding telephone number for this special conversation of the second contact name 320 can be dialled directly. The presence key 402 allows interaction with the availability status/actions of the user, and is indicated via the LED lamp 413 associated with the presence key 402. The LED lamp 413 may indicate multimedia specific settings (i.e. Snooze, logged in at the Media application or invited to a conference) that are coordinated with the Media application 309. Additionally the LED lamp 413 may indicate if Call Forwarding (CF) for all calls is currently active for example. The LED lamp 413 can be On or flashing in one of three colours, or be Off. The colours and cadence are used to identify a specific set of states. The key action is to show the Presence screen where the user can see the status of all their media and phone presence settings (i.e. Snooze, connected to the Media application, invited to a conference, CF, "Do-Not-Disturb" (SND), mobility between users & phone lock) and has the option to change them.

By pressing a toggle-to-menu key 414 the main menu of the desktop telephone 400 is displayed on the telephone display 500, from which for example the current time and date can be seen, and which main menu provides an option to access the Settings menu where the display brightness, for example, can be changed FIG. 4b illustrates the example embodiment of the first Conversation list where individual conversation items are displayed in a scrolling window on the graphical display unit of the embedded device 310. Each conversation item is identified by a contact name 323 plus an avatar image 317 where the avatar is either specified for the contact or provided as a default avatar by the system when the contact does not specify an avatar. In this example all the conversations shown are for call activity where an icon 321 indicates the status of the latest call and text 322 is used to reinforce this and indicate the call duration as appropriate. The illustration shows one active conversation (call still in progress) with the rest representing historic conversations (where a call has ended). A date stamp 325 shows when a call was completed or shows the duration of an active call. Associated with each conversation in the list is a default action; in the case of an active call the action 319 may be to show the details of the call where further actions are possible, whilst for a historic conversation the action 320 may be to initiate a call using the default telephone number of the contact. For historic conversations an alternative action 324 allows details of the conversation to be shown where the previous history of conversation may be seen or details of the contact for the conversation may be accessed. Finally, this example of the conversation list provides an action 318 to allow the conversations to be searched by name or by number.

The terms having essentially the same functions in the following embodiments according to FIGS. 5a, 5b, 7a, 7b, 8a, 8b, 9a and 9b are identified with the same reference numerals as in FIGS. 4a and 4b.

Figure 5B:
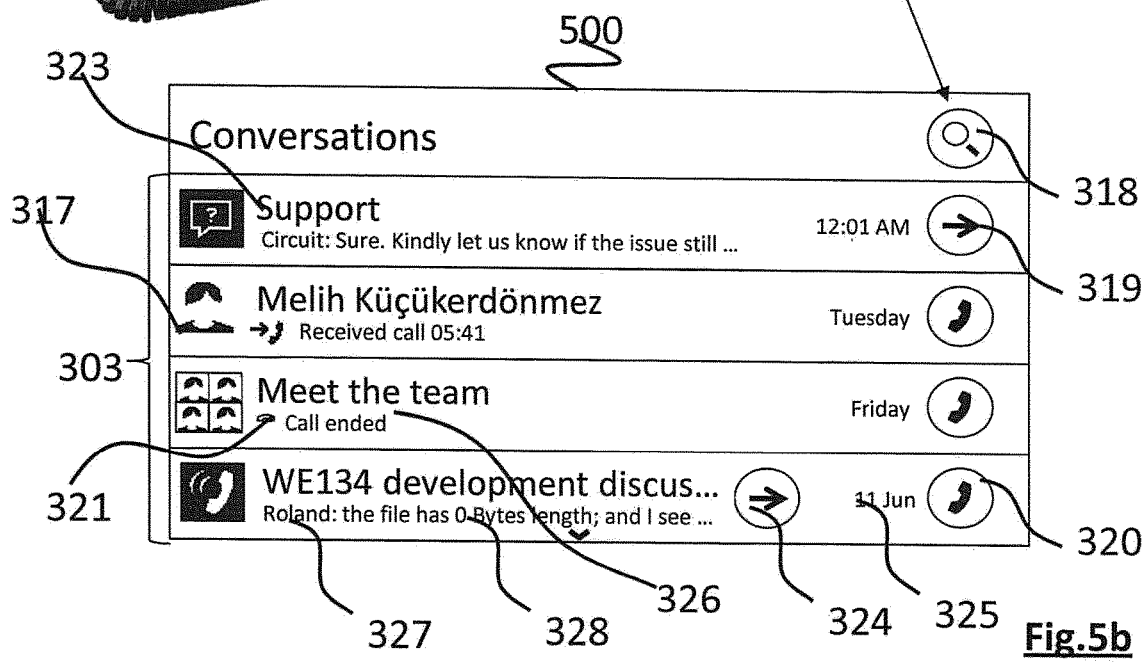
FIG. 5b illustrates the display of the multimedia desktop telephone of FIG. 5a incorporating the second example embodiment of the invention in an enlarged scale showing the second conversation list according to an example embodiment of the invention.

FIG. 5a illustrates the multimedia desktop telephone incorporating the second example embodiment of the invention according to FIG. 4a, however showing on its display a second conversation list according to an example embodiment of the invention. FIG. 5b illustrates the display of the multimedia desktop telephone of FIG. 5a in an enlarged scale showing the second conversation list.

FIG. 5b provides and illustrates the example embodiment of the second conversation list 303 where media application sourced conversations are shown integrated with call oriented conversations. Again each conversation has a name 323 to identify it and an avatar 317 to complement the name. The second conversation in this illustration represents a call oriented conversation where the avatar 317 relates to the peer user of the call. The third conversation in this illustration represents a media call where the media application was used for the call. The status of the call is indicated as reference 326 in FIG. 5b in the conversation. Where the last use of the conversation was for a non-call activity (e.g. a message exchange) then the source of the activity 327 is indicated, and in the case of messaging a snippet 328 from the message may also be shown.

Where the conversation does not have an associated number that can be called the action 319 for the conversation may provide access to more details about the conversation and its recent history. Where there is one or more numbers associated with the conversation then the action 320 may be to initiate a call from the embedded device 310 to the default number for the conversation. In such cases an alternative action 324 allows access to more details about the conversation and its recent history. As in FIG. 4b there is also the option to search 318 the conversations in the list by name or by number.

Figure 6:
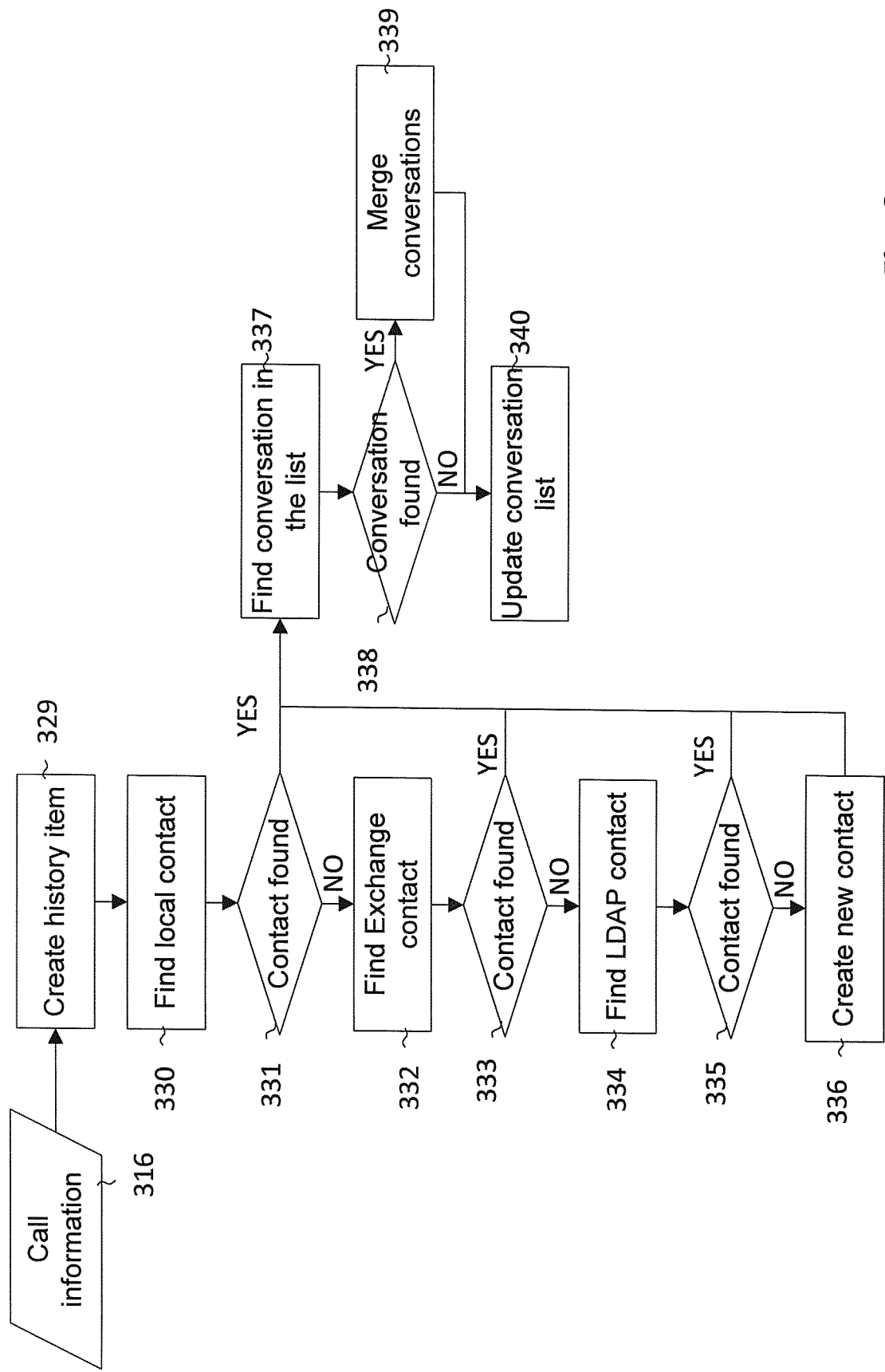
FIG. 6 illustrates a flow diagram of the processing within a further example of an embedded device 310 according to a further embodiment of the invention.

FIG. 6 illustrates the flow of processing within the embedded device 310 on receipt of information from the telephony server on a new call. Information about a call 316 arrives from the Telephony server 311 and is used to create a new history item 329 in the Call history 310E. The device then attempts to match the peer party in the new call to a contact using a preferred order. First it tries to find a contact in the local database 330 where the contact contains a telephone number that matches the number from the Call information 316. If no local contact is matched then the device tries to find a matching contact from the Exchange server 332. If the Exchange server is not available or a match cannot be found then the device goes on to search the LDAP directory 334 for a match. If no matching contact could be found then the device creates a new contact 336 using the name provided by the call information 316. When the device has a matching contact 331, 333, 335 or 336 it tries to find an existing conversation in the Conversation list 303 that has the same contact. If it finds a matching conversation 338 then it merges the new history item into the existing conversation 339. Finally the new or updated conversation is moved 340 to the appropriate location (usually the top) within the Conversation list 303.

Figure 7B:
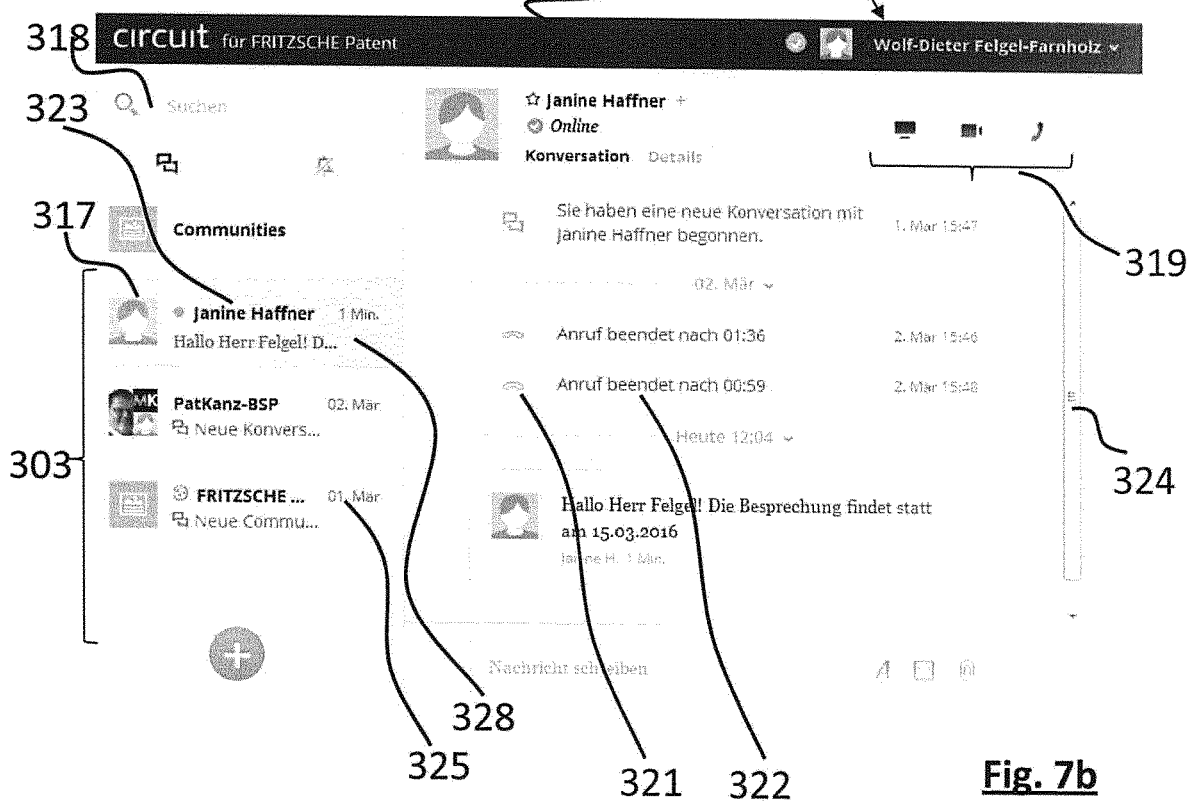
FIG. 7b illustrates the display of the multimedia personal computer (PC) of FIG. 7a incorporating the third example embodiment of the invention in an enlarged scale showing the third conversation list an example embodiment of the invention.

FIG. 7a illustrates a multimedia personal computer (PC) 600 comprising a computer monitor 601, a keyboard 602 and a computer mouse 603 and a not shown video camera 604; incorporating a third example embodiment of the invention showing a third conversation list displayed on its computer screen 501 according to an example embodiment of the invention. FIG. 7b illustrates the displayed screen 501 of the multimedia personal computer (PC) 600 of FIG. 7a in an enlarged scale showing the third conversation list 303. On the left hand side of the computer screen 501 the conversation list 303 is shown and on the right hand side the detailed conversation of the name 323 selected by the mouse pointer. With the three buttons 319 there can be selected the mode of conversation with the selected name 323, i.e. on the right a telephone call, in the middle a video conference and on the left a screen sharing.

The personal computer (PC) 600 is connected by a not shown IP communication network with the IP communication cloud 800 similar as with the multimedia desktop telephone 400 shown in FIG. 4a and FIG. 5a. As already previously indicated all the operation on this multimedia desktop telephone is synchronized with a not shown database in the IP communication cloud 800 and with all other embedded devices 310 as incorporated in the multimedia desktop telephone 400 as shown in FIG. 4a and FIG. 5a and as incorporated in the personal computer (PC) 600 as shown in FIG. 7a and as incorporated in the mobile phone 700 as shown in FIG. 8a and FIG. 9a.

FIG. 8a shows a multimedia handheld mobile telephone incorporating a fourth example embodiment of the invention showing a fourth conversation list on its display according to an example embodiment of the invention.

Figure 8B:
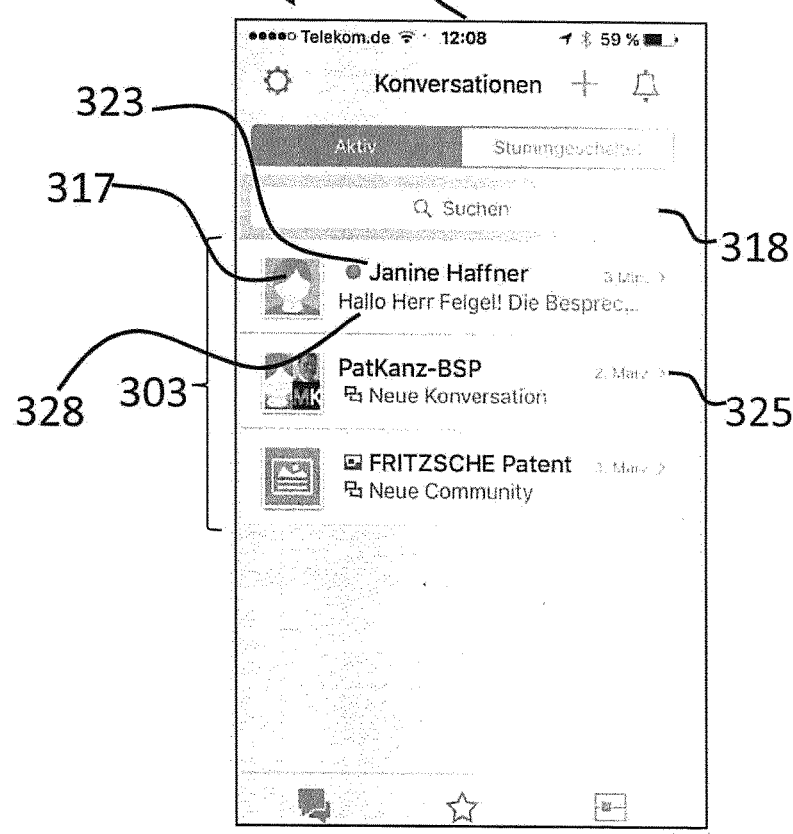
FIG. 8b illustrates the display of the multimedia handheld mobile telephone of FIG. 8a incorporating the fourth example embodiment of the invention in an enlarged scale showing the fourth conversation list on its display according to an example embodiment of the invention.

FIG. 8b illustrates the display of the multimedia handheld mobile telephone 700 of FIG. 8a in an enlarged scale showing the fourth conversation list on its display. FIG. 8b illustrates the mobile phone display 502 of the multimedia handheld mobile telephone 700 of FIG. 8a in an enlarged scale showing the third conversation list 303. Because of the synchronization via the IP communication cloud 800 the same user as with the personal computer (PC) 600 there is displayed the conversation list 303 from the left hand side of the computer screen 501 is shown on the mobile phone display 502 as fourth conversation list.

The multimedia handheld mobile telephone 700 is connected by a not shown IP communication network with the IP communication cloud 800 similar as with the multimedia desktop telephone 400 shown in FIG. 4a and FIG. 5a. As already previously indicated all the operation on this multimedia desktop telephone is synchronized with a not shown database in the IP communication cloud 800 and with all other embedded devices 310 as incorporated in the multimedia desktop telephone 400 as shown in FIG. 4a and FIG. 5a and as incorporated in the personal computer (PC) 600 as shown in FIG. 7a and as incorporated in the mobile phone 700 as shown in FIG. 8a and FIG. 9a.

Figure 9B:
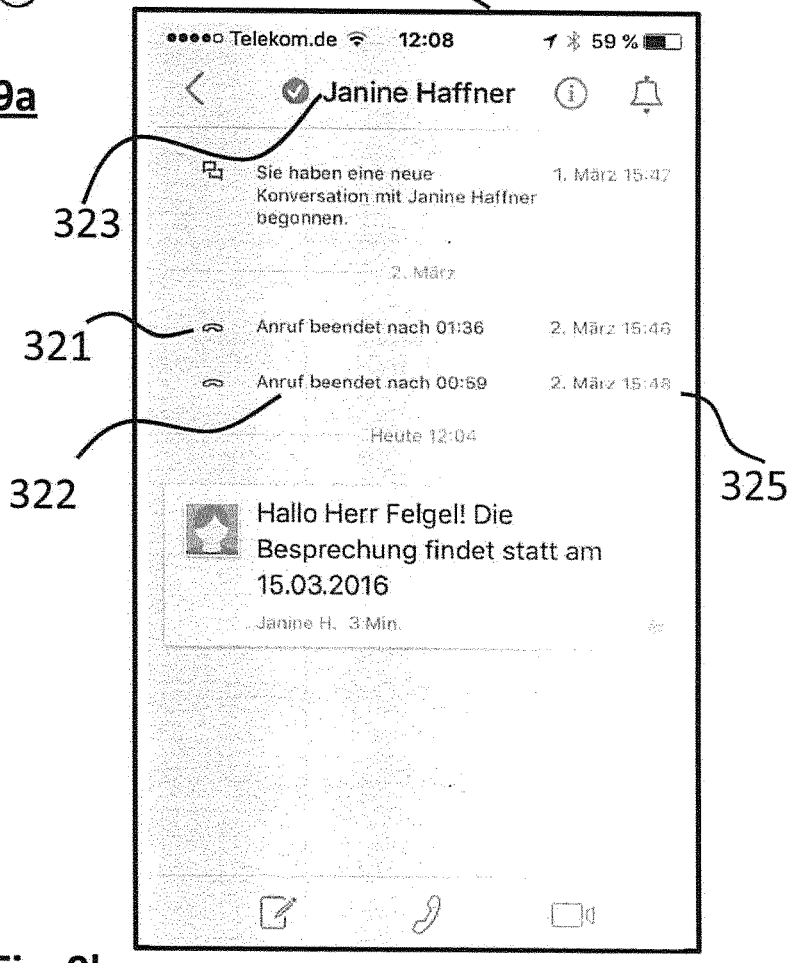
FIG. 9b illustrates the display of the multimedia handheld mobile telephone of FIG. 9a incorporating the fourth example embodiment of the invention in an enlarged scale showing on its display the fifth conversation list according to an example embodiment of the invention.

FIG. 9a illustrates the multimedia handheld mobile of FIG. 8a incorporating the fourth example embodiment of the invention showing on its display a detailed conversation list which belongs to the first name 323 of the fourth conversation list 303 in FIG. 8b. FIG. 9b illustrates the display of the multimedia handheld mobile telephone of FIG. 9a in an enlarged scale showing on its display the detailed conversation list. Moreover, if the first name 323 on the fourth conversation list 303 in FIG. 8b is selected by touching thereon, then on the mobile phone display 502 in FIG. 9b the right hand side of the detailed conversation of the name 323 of the computer screen 501 of the personal computer (PC) 600 as shown in FIG. 7b is displayed.

The multimedia handheld mobile telephone 700 is connected by a not shown IP communication network with the IP communication cloud 800 similar as with the multimedia desktop telephone 400 shown in FIG. 4a and FIG. 5a. As already previously indicated all the operation on this multimedia desktop telephone is synchronized with a not shown database in the IP communication cloud 800 and with all other embedded devices 310 as incorporated in the multimedia desktop telephone 400 as shown in FIG. 4a and FIG. 5a and as incorporated in the personal computer (PC) 600 as shown in FIG. 7a and as incorporated in the mobile phone 700 as shown in FIG. 8a and FIG. 9a.

Because of the synchronization of the operation via the IP communication cloud 800 on each embedded device 310 as incorporated in a multimedia desktop telephone 400 or in a personal computer (PC) 600 or in the multimedia handheld mobile phone 700 the operation of the user can be executed on each of said embedded devices 310 independently by choice of the user at any time, Therefore the user can leave his office and therefore leave his personal computer (PC) 600 and continue on the multimedia desktop telephone 400 in any room of the office or continue on the multimedia handheld mobile phone 700 when leaving the office.

Further advantages e.g. by the embodiment of the inventions:

The invention proposes a method and system for an integrated user experience between a business social collaboration with real-time communication system like Circuit™ which is a registered trade mark of Unify GmbH & Co. KG, 81379 München, Germany and is a WebRTC-based Cloud-Service for the communication and collaboration of teams in enterprises and with online communities (see explanation in: https://www.unify.com/uk/products-services/circuit.aspx) and an associated desktop telephone, like OpenScape Desk Phone CP600 or CP400. Circuit™ is available as a client application on a range of devices, including personal devices such as smartphones and tablets, which makes it highly mobile and allows any device running the Circuit™ application that is owned by the user to be employed for communication and collaboration (as conversations). Audio and video calls, or screen sharing, can be moved between devices during a call or session. An associated desktop phone can provide a view of the collaboration by the user and allows an audio call to be moved from a smartphone (for example) to the desktop phone or vice-versa.

These desktop phones display a conversation list as a merged list from recent calls, contacts, directory search results. Usually the call log (also known as journal), private contacts, and corporate contacts are separated views displayed on a phone display and be separately navigated through. This user experience is available offline at the desktop phone if the user is not logged on with Circuit™ on a mobile device and/or desktop PC/laptop or is not a Circuit™ user at all.

As soon as a Circuit™ user logs on and communicates using a conversation at the desktop PC or laptop, this conversation item 302 moves on top of the list displayed at the desktop telephone 400 as well. The desktop phone works so to say ghost-handed in synchronization with the activities of the user within the Circuit™ session. Instead of using the WebRTC of Circuit™ within the browser for calls, the user may choose to join a voice conference via their desktop phone, using the SIP protocol by simply clicking on the short-dial button next to the display line, simply hook-up the desktop phone handset, or push the ok-button of the navigation control wheel 408 to enjoy a quality assured connection across the IP network and other features like echo compensation and so on. While in a Web Real-Time Communication (WebRTC) audio/video call the user may, via their desktop phone, expand the conversation displayed in the display of the desktop phone 400 to the individual list of the attendees, put the WebRTC session on mute and initiate a side-talk to another party of the conference/collaboration session (provided she/he has also a SIP endpoint) by clicking the short-dial button 412 next to the displayed conferee of the expanded list. SIP stands for Session Initiation Protocol, e.g. as defined in standard RFC 3261. Furthermore, the user may pull an active WebRTC session toward the desktop phone, e.g. while approaching the desk with the mobile telephone 700 or when experiencing quality issues with the WebRTC audio connection.

The main feature of the invention is to provide a consistent and integrated user experience for a CP600 or a CP400 telephone in context of Circuit™.

The motivation to create a new desktop telephone 400 according to the invention was the dedication to the Business Social Software with RTC (Real Time Collaboration).

The main feature of this desktop phone according to the invention is that it works within the context of an application at the desktop PC or mobile device running a Web-client. The phone is adjacent to it. It is not only in synchronisation with the application but rather provides a corresponding (ghost-handed), simultaneous appearance and context.

This context allows for some sort of "multi-modality", e.g. during a chat in the Web-client that gets stuck, or initiating a call to the chat peer. The call can be initiated with the Web-client by a single key press at the desktop telephone 400 or by simply picking up the handset 401 of the desktop telephone 400. If the user wants to apply confidentiality for the call he uses the handset or headset of the desktop phone for the call instead of loud speech. As a side effect, through the desktop phone the user has a second path if the Web Real-Time Communication (WebRTC) call does not work or experiences quality issues. Naturally, one can transfer the call seamlessly between WebRTC and SIP.

In case of a multi-party conversation, the desktop phone may initiate a conference or one can navigate to pick a specific contact for a two party call.

In the embodiments as shown in the drawings of the present invention a call is pushed by from a client to the desktop phone. The present invention covers the situation that one can pull an active real-time communication to the desktop phone push it back.

It is possible to create a side talk with one or more participants via desktop phones during a group conversation using the desktop phone while listening to the group conversation one's self being on mute in the group conversation, i.e. WebRTC interworking have to be bypassed with SIP End-to-End since currently only one WebRTC based conversation is possible at a time since the SIP call is independent of the WebRTC call taking place at the client. In a further embodiment, not shown in the drawings, there is some logistics for the user to consider in being involved in two calls via two different audio devices at once.

Other features providing for a multi-modality kind of user experience across devices/clients:

Handover (move) a call between desktop phone and client and vice versa (including pulling the call from a mobile client to the desktop phone.

Handing over a call from a client to a desktop phone for a better audio quality under varying mobile network conditions.

Selecting and calling a single participant via the telephone system out of a multi-party audio/video conference e.g. as part of a Circuit™ conversation. The conversation displayed at the desktop phone can be viewed as a list of the individual participants while the associated user is engaged in that conference at a client. Circuit™ is a registered trade mark from Unify GmbH & Co. KG and a WebRTC-based Cloud-Service for the communication and work together of teams in enterprises (see: https://www.unify.com/uk/products-services/circuit.aspx).

Emphasising the strengths of the desktop phone in terms of ease or familiarity of use compared to a PC client, tablet or smartphone.

Emphasising the strengths of the desktop phone in terms of reliability and availability, i.e. always powered and immediately to hand.

Emphasising the strengths of the desktop phone in terms of audio quality via its dedicated hardware.

Initiating or joining a group conversation (conference) within a real-time communication system e.g. from a phone as an always-on device. Engaged conversations are displayed at the desktop phone for ad-hoc joining.

Handing over a call from a client to a desktop phone from the message system, e.g. Circuit™ feature, is possible with the invention. The conversion between a WebRTC call at a client and a telephone call (e.g. SIP) at the phone is handled by Circuit's telephone connector device which is a special embodiment not shown in the drawings.

The present invention comprises features which are not shown in the figures of the invention, such as Both WebRTC call and message system, e.g. Circuit™, and desktop phone based conversation is shown in the same conversation list. The real-time communication system, e.g. Circuit™, shows a conversation for an active telephone call at the desktop phone. However, the WebRTC call and message system, e.g. Circuit™, shows conversations for historic conversations. This means that when the call active at the phone ends, it will be shown as its own conversation item in the conversation list which is thus shown on the desktop phone.

REFERENCE LIST

[1] OpenScape Desk Phone CP (SIP)—Experts Wiki
Printed on Aug. 7, 2016 17:08 from the link below as Annex [1] http://wiki.unify.com/wiki/OpenScape Desk Phone CP (SIP)
Author: Haidar at Experts Wiki (see editing history in Annex [2])

[2] Direct link to "Documentation and Training" within link of Annex [1]
http://wiki.unify.com/wiki/OpenScape Desk Phone CP (SIP)#Documentation and Training
With relevant embedded documents:
[3] OpenScape_Desk_Phone_CP600_SIP,_User_Guide,_Issue_2.pdf—http://wiki.unify.com/images/b/bc/OpenScape Desk Phone CP600 SIP %2C User Guide %2C Issue 2.pdf
Title: OpenScape Desk Phone CP600, OpenScape Key Module 600, OpenScape Voice, User Guide SIP
Reference No.: A31003-C1000-U102-2-7619
Author and Copyright©: Unify Software and Solutions GmbH & Co. KG May 2016, Mies-van-der-Rohe-Str. 6, 80807 Munich/Germany
[4] OpenScape_Desk_Phone_CP600_SIP,_Quick_Reference_Guide,_Issue_1.pdf http://wiki.unify.com/imaqes/a/a5/OpenScape Desk Phone CP600 SIP %2C Quick Reference Guide %2C Issue 1.pdf
Title: OpenScape, Desk Phone CP600, Quick Reference Card
Reference No.: A31003-C1000-U105-1-7619
Author and Copyright©: Unify Software and Solutions GmbH & Co. KG 5/2016, Mies-van-der-Rohe-Str. 6, 80807 Munich/Germany
[5] Detailed device OpenScape Desk Phone CP600
http://wiki.unify.com/imaqes/1/17/OpenScape Desk Phone CP600 perspective vie w low.png
see FIG. 12a on the drawing page 11/13.

LIST OF ANNEXES

Annex 1 (corresponding to reference [11] above):
OpenScape Desk Phone CP (SIP)—Experts Wiki
Printed on 08.07.2016 17:08 from the link below as Annex [1] on pages 27 to 38 (see FIG. 10 to FIG. 12 and FIG. 13 to FIG. 17) http://wiki.unify.com/wiki/OpenScape Desk Phone CP (SIP)
Author: Haidar at Experts Wiki
Annex 2 (corresponding to reference [1] above):
Editing history of Annex 1 on ages 39 to 40.

LIST OF REFERENCE SIGNS BEING PART OF THE DESCRIPTION 100 social networking system
111 users
112 apps
113 events
114 groups
115 hubs/pages
116 media
117 locations
118 concepts
119 messages
120 graph network store
150 application programming interface (API)
160 network
170 mailbox module
180a client (mobile phone)
180b client (desktop computer)
180c client (desktop telephone)
190 third-party website
200 offline storage
210 third-party IM service
220 third-party social media site
230 VoIP service 240 video service
250 other service providers
300 wireless network
301 contact
301A linked contact
302 conversation item
303 combined conversation list
304 history record
305 call history record
306 media history record
307 LDAP server
308 exchange server
309 media application
310 embedded device
310A conversation builder
310B aggregator
310D contacts (within the device)
310E call history
311 telephony server
312 contact (found by LDAP server)
313 contact (provided by exchange server account)
314 conversation items
315 outgoing telephone call
316 Incoming telephone call//call information
317 avatar image
318 action (search conversation by name or number)
319 action (while active call for call control)
320 action (for historic conversation—initiating call)
321 icon (for status of latest call in the conversation)
322 text
323 contact name
324 action (access to more details about the conversation and its recent history)
325 date stamp
326 Textual status of the call
327 source of activity//teaser (part of first line in the message) e.g. Roland
328 snippet of message//teaser (part of first line in the message) e.g. the file . . .
329 history item
330 local database
331 matching contact
332 exchange server
333 matching contact
334 LDAP directory
335 matching contact
336 new contact
337 search conversation list
338 matching conversation
339 existing conversation
340 updated conversation list
400 multimedia desktop telephone
401 telephone receiver (handset)
402 presence key (for availability status/actions)
403 telephone keypad (alphanumerical)
404 volume button
405 mute button
406 loudspeaker button
407 headset button
408 navigation control wheel for the telephone display
409 directory
410 select button
411 key module
412 select button
413 LED lamp for call activity indications
414 Toggle-to-menu key
500 telephone display
501 computer screen
502 mobile phone display
600 Personal computer (PC)
601 computer monitor
602 keyboard
603 computer mouse
604 video camera
700 mobile phone
800 IP communication cloud Annex Go gle  Display this page in: German  Translate  Deactivate for: English  Options ▼

Harmonize

Experts Wiki

- Home
- Devices
- Communications Systems
- Unified Communications
- Developer Program Search  Go  Search

OpenScape Desk Phone CP (SIP)

It's more than just a phone

Working with frog design, a world renowned industry leader in product design, UNIFY has created a line of beautiful devices that people like to use. The result is a simplified user interface with relevant features combined to meet a broad set of use cases in a concentrated family of phones. We've also added numerous interoperability options including the unique opportunities Circuit integration provides.

Figure 10:
FIG. 10 illustrates a perspective view on the OpenScape Desk Phone CP200 as described on page 27 of Annex 1.

OpenScape Desk Phone CP200     see Fig. 10

Figure 11:
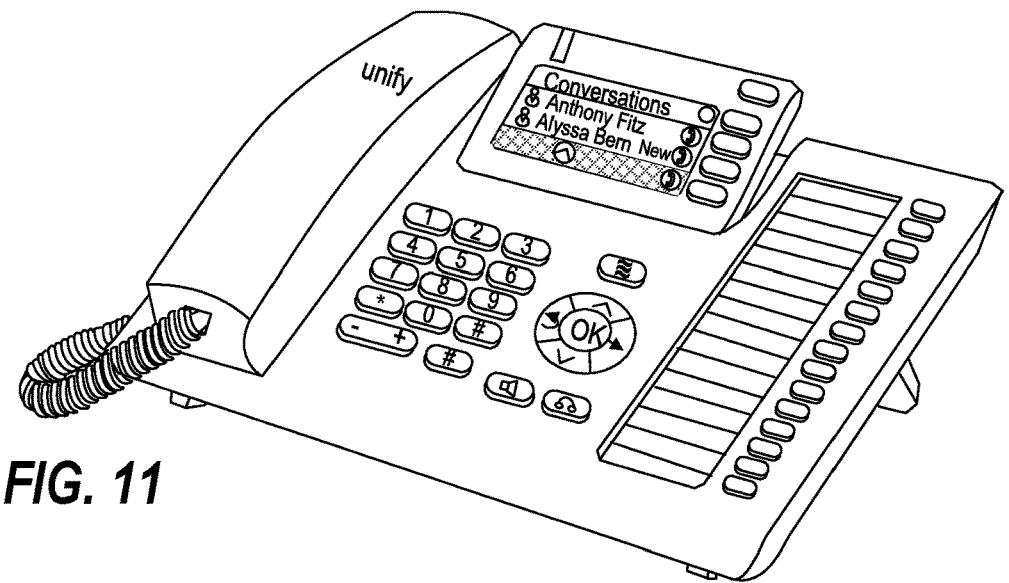
FIG. 11 illustrates a perspective view on the OpenScape Desk Phone CP400 as described on page 27 of Annex 1.

The new OpenScape CP Family of phones brings feature evolution and updated capabilities such as:

- Enterprise desk top voice with collaboration software integration
- Bluetooth connectivity complemented by Near Field Communication (NFC) for simplified free seating by using your smartphone as a login passport
- High end audio quality with a stylish, fresh, bold device design OpenScape Desk Phone CP400     see Fig. 11

The OpenScape Desk Phone CP family upholds the success story of optiPoint and OpenStage and brings the heritage of high quality acoustic features along with immersive, native compatibility to the OpenScape Voice solution. The large scale network and robust security experience is also taken over to the new family.

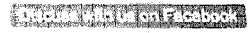

Figure 12:
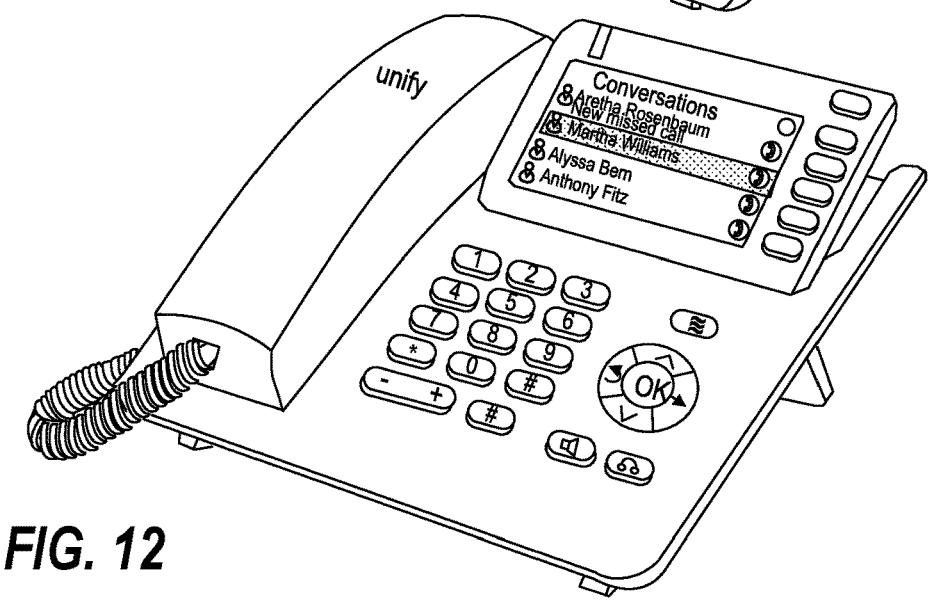
FIG. 12 illustrates a perspective view on the OpenScape Desk Phone CP600 as described on page 27 of Annex 1.
Figure 12A:
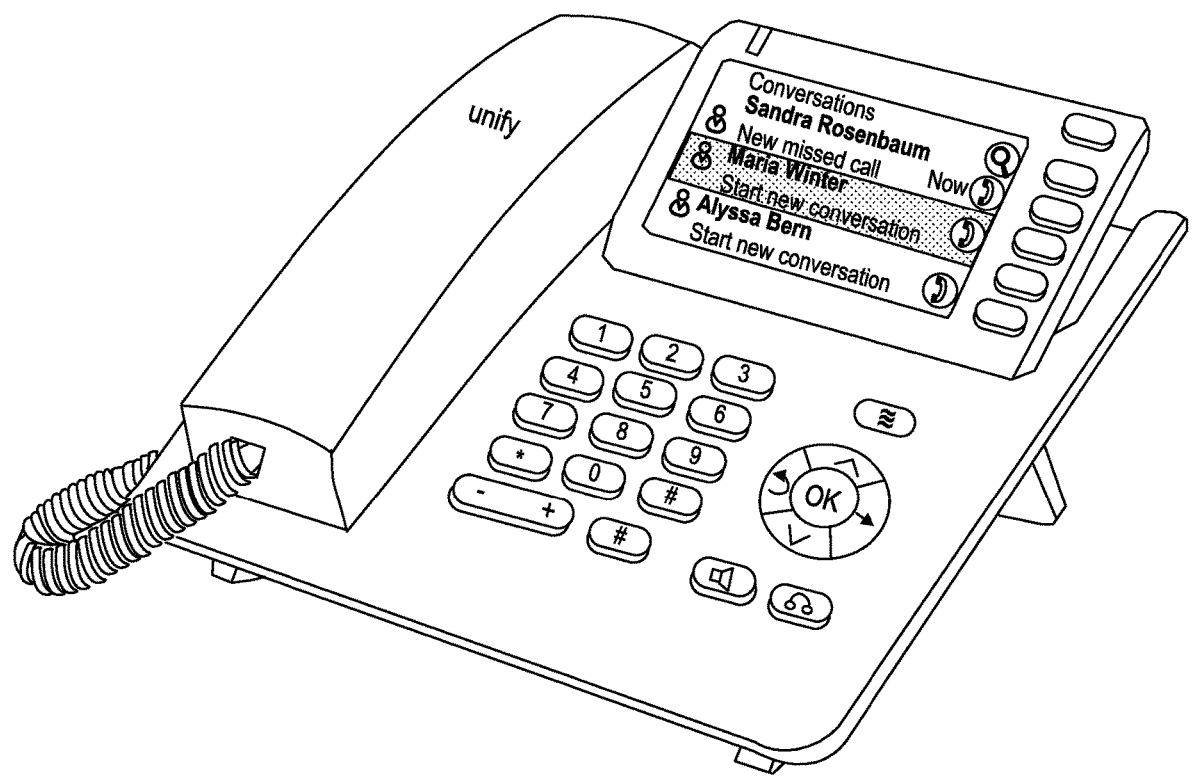
FIG. 12a illustrates the enlarged perspective view on the OpenScape Desk Phone CP600 of FIG. 12 as described on page 27 of Annex 1 and as defined in reference [5] on page 23.

UNIFY brings decades of experience and a thoughtful approach to design and feature for the OpenScape Desk Phone CP family resulting in:

OpenScape Desk Phone CP600     see Fig. 12

- Ease of Use
    - Completely new, intuitive User Interface
    - Tidy key layout with clear function division
    - Colored LEDs in the function keys to display statuses
    - Keys with backlight even visible in bright surroundings
    - New hardware architecture for improved performance
    - Mechanical hook switch with robust, clear feedback
    - Concave keys shape with an intuitive pressure point
    - Built-in stand with two different angles (flat and steep)
    - Key module with new display technology, connector without cable
- Adaption and Integration
    - Microsoft Exchange® / Circuit® connector
    - LDAP Client to access corporate directories
    - Advance interaction with Smartphones (e.g. via NFC to lock the phone)
    - Headset connection in all models
    - Wideband audio via Bluetooth
- New Opportunities
    - Bluetooth secure simple pairing using NFC to simplify the pairing process
    - Audio gateway scenario: Phone acts as an audio gateway to connect to Bluetooth headsets and speakerphones / hands-free units
    - Proximity detection to lock the phone and protect personal data
    - Bluetooth Low Energy Beacon with support for Eddystone(TM)

Please note, not all functions are available for all models. For details, please scroll down.
Detailed information to Bluetooth, Eddystone and NFC can be found here.

Phone range

For most customers and many scenarios, the desk phone is still the preferred device for voice conversations. Users want instante, enterprise grade communication while organizations want cost effective, secure choices.

But today's customers, who see value in desk phones, want them to participate differently. They want to make the most of voice communication in the new way to work and where appropriate, have them play a more active role in the digital workplace.

Model Overview

By thoughtfully focusing on primary features, we've condensed the new phone family into a concentrated portfolio that still meets a broad set of

Annex 1

- OpenScape Desk Phone CP200: A reimagined, feature rich entry level device with superior audio quality. Ideally for users typical workers needed UC-/CTI-support.
- OpenScape Desk Phone CP400: Mid-tier device with a larger display, numerous programmable keys. It's the right device for office and team environments.
- OpenScape Desk Phone CP600: Ideal for the collaborative workplace with many interoperability capabilities and optional Key Modules.

Accessories:

- OpenScape Key Modul KM400 with paper label and 16 keys with LEDs as extension for OpenScape Desk Phone CP400
- OpenScape Key Modul KM600 with display and 12 keys with LEDs as extension for OpenScape Desk Phone CP600

New user interface

The OpenScape Desk Phone CP400 and OpenScape Desk Phone CP600 were equipped with a new user interface. It translates the innovative concept of Circuit conversations into the world of telephony. The distributed concept of contact and call logs are merged into a single list of conversations. A conversation consists of contact information and up to three journal entries. The contact data can be automatically supplied from external sources, such as LDAP or Exchange.

The new, higher-performance, hardware architecture allows the holding of up to 1000 conversations with 3 journal entries. The new search functionality gives easy access to conversations and automatically integrates external sources like LDAP.

The telephony function is given highest priority. Therefore the conversation list is the starting point for all interactions.

The most commonly used telephony functions are accessible by a single keystroke. The new soft key concept is the main difference to the well-known OpenStage concept.

The integration of LDAP is seamless. The integrated search function accesses both, the local list of conversations, as well as LDAP information and presents the results within one search result. Incoming or dialed numbers not part of the conversation list are automatically supplied with LDAP information, if available.

The new OpenScape Desk Phone CP400 and OpenScape Desk Phone CP600 are a bridge to Circuit. In operation without Circuit the User Interfaces uses the consistent design language of Circuit and eases the change, or the expansion of existing communications infrastructure toward the trendsetting Circuit eco system. The phones remain part of the system. The build-in Circuit connector synchronizes the conversation list with Circuit and integrates the phone to active participants in single and group conversations. This protects the customer's investment and makes the phones future-proof for the new way of communication.

Feature Overview

For Details please scroll down

OpenScape Desk Phone CP200

Figure 13:
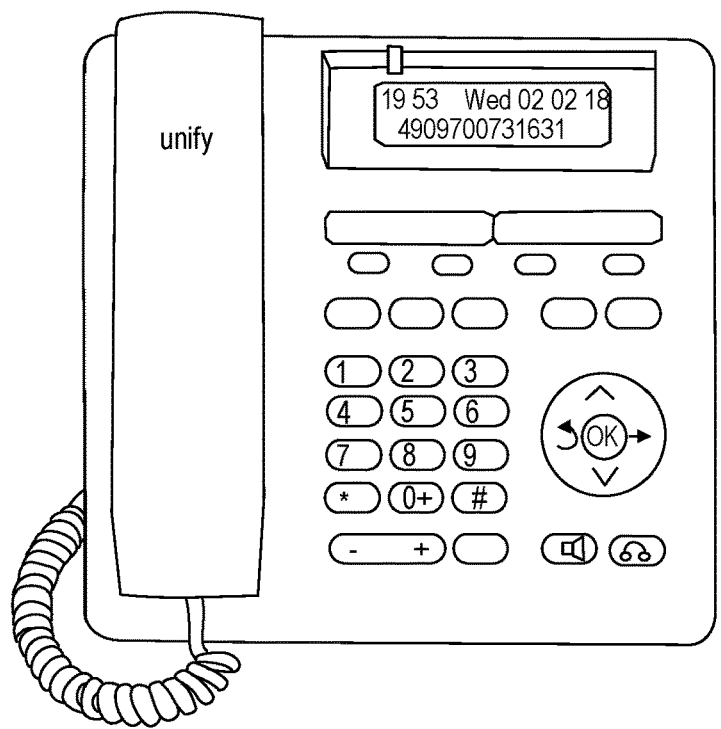
FIG. 13 illustrates a top view on the OpenScape Desk Phone CP200 as described on page 28 of Annex 1.

The OpenScape Desk Phone CP200 is an uncompromising value phone for easy entry into VoIP telephony. It supports the entire range of OpenScape Voice features, has a headset socket and four programmable function keys. The keys are preprogrammed with 'conversations',' people ',' forwarding 'and' redial '. However, they can also be configured as a four line keys for example. The focus on essential functions makes the CP200 an ideal companion for CTI supported workstations. In addition, the phone has fixed function keys for 'hold', 'transfer' and 'conference' to quickly interact with the call party. This phone already supports AudioPresenceTM, our trademark for HD audio.

see Fig. 13

- Graphical display, 2 lines (192*48 pixel), monochrome
- Notification LED
- 4 free programmable feature keys with LED, Pre-programmed with: Call Log, Directory, Forward, Redial
- 5 fixed feature keys, 3 with LED Hold, Transfer, Conference, Settings, Messages
- 4-way navigator, plus OK-key
- 3 audio keys (Mute/Speaker/Headset) with LED
- Volume control +/-
- Open listening / Handsfree talking (Full-duplex)
- Headset port (DHSG/EHS)
- 10/100 Base-T Ethernet Switch
- IEEE 802.3af Power over Ethernet, class 1
- Wall mountable OpenScape Desk Phone CP200

OpenScape Desk Phone CP400

Figure 14:
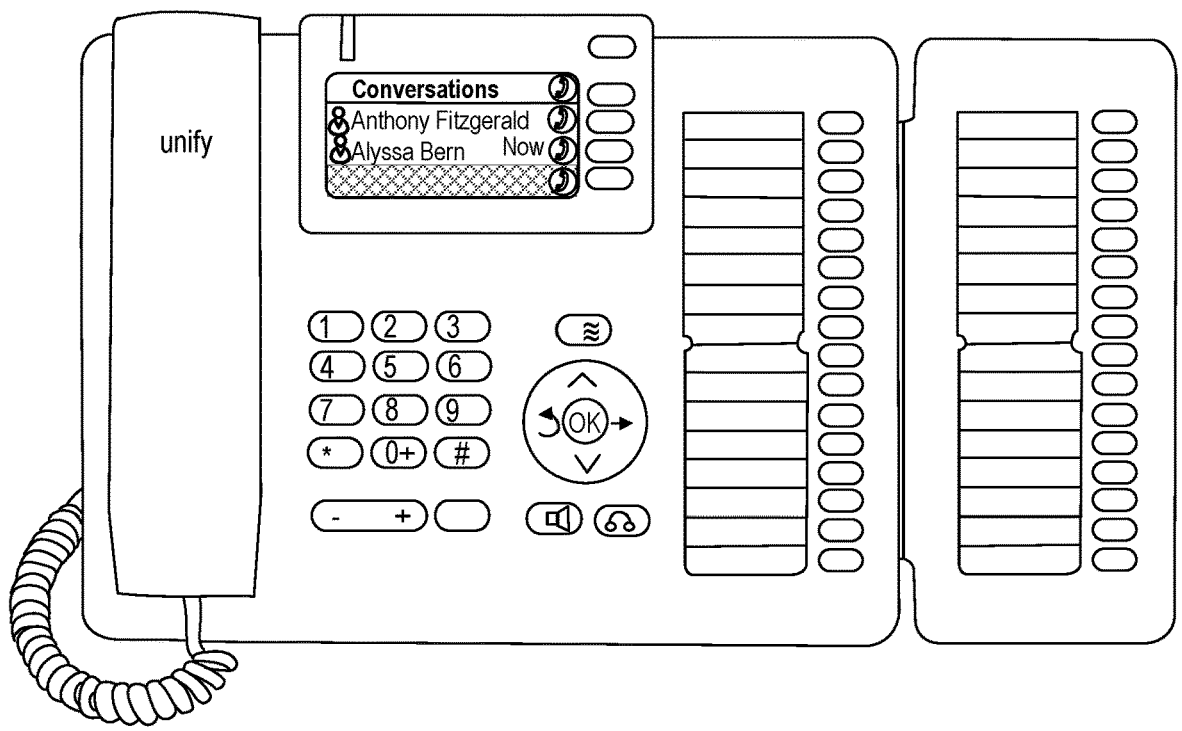
FIG. 14 illustrates a top view on the OpenScape Desk Phone CP400 extended with a Key Module as described on page 28 of Annex 1.

The CP400 is the midrange phone for the budget-conscious, professional user. Even the basic unit has 16 programmable function keys with tri-colored status indicator. It can be expanded with up to two Key Modules KM400 with 16 function keys. The paper label reduces the cost and meets customers request for many programmable keys. The power saving design allows the connection of two key modules within the PoE Class 2.

see Fig. 14

- Tilt able graphical display, 3,7" (240*120 pixel), monochrome
- LED backlight (white)
- Notification LED
- 4 context sensitive soft keys with LED
- 2 fixed feature keys (Menu/Out-of-office)
- 16 free programmable feature keys with LED
- 4-way navigator, plus OK-key
- 3 audio keys (Mute/Speaker/Headset) with LED
- Volume control +/-
- Open listening / Handsfree talking (Full-duplex)
- Headset port (DHSG/EHS)
- 10/100/1000 Base-T Ethernet Switch
- IEEE 802.3az Energy Efficient Ethernet
- IEEE 802.3af Power over Ethernet, class 2

OpenScape Desk Phone CP400 with Key Modul

Annex 1

OpenScape Desk Phone CP600

The CP600 is designed for the collaborative workplace. The consistently paperless design is particularly suitable for mobile workers or environments. The base unit is optimized for single line usage. Four freely programmable functions can be applied to favorites on a second level. Up to four connectable key modules with 12 buttons each satisfies the need of many free programmable keys. The high resolution display of Key Modules shows the key label and additional information like status and action icons. The key module is highly recommended for multiline usage. It provides interactive line information as well as status information using the display and the three color key LED. The CP600 is equipped with a new Bluetooth 4.1 function. Bluetooth headset are supported in HD audio quality. The new 'Bluetooth Proximity' feature allows to automatically lock the phone when the headset or other Bluetooth device is removed from the phone range. The built-in NFC chip simplifies the Bluetooth pairing with compatible Smartphones.

- Tiltable graphical TFT display, 4,3" (480*272 pixel), color
- LED backlight (white)
- Notification LED
- 5 context sensitive soft keys with LED
- 2 fixed feature keys (Menu/Out-of-office)
- 4-way navigator, plus OK-key
- 3 audio keys (Mute/Speaker/Headset) with LED
- Volume control +/-
- Open listening / Handsfree talking (Full-duplex)
- Headset port (DHSG/EHS)
- 10/100/1000 Base-T Ethernet Switch
- IEEE 802.3az Energy Efficient Ethernet
- IEEE 802.3af Power over Ethernet, class 2
- Bluetooth 2.1 BR/EDR and Bluetooth 4.1 LE (dual mode device)
- NFC; SD card Interface
- Key Module KM600 optional
- Wall mountable Detailed information to Bluetooth, Eddystone and NFC can be found here.

Key Module KM400

- Optional paper labeled Key Module for OpenScape Desk Phone CP400
- 16 free programmable feature keys with LEDs
- Max. 2 Modules per phone

Key Module KM600

- Optional Display Key Module for OpenScape Desk Phone CP600
- High contrast monochrome TFT display
- 12 free programmable feature keys with LEDs
- 2 Navigation keys
- Max. 4 Modules per phone

Detailed feature description

Body

| Feature | OpenScape Desk Phone CP 200 | OpenScape Desk Phone CP 400 | OpenScape Desk Phone CP 600 |
|---|---|---|---|
| Body color | Black | | |
| Standing Positions | two positions | | |
| Handset and Stand with Company logo | Yes | | |

Display

| Feature | OpenScape Desk Phone CP 200 | OpenScape Desk Phone CP 400 | OpenScape Desk Phone CP 600 |
|---|---|---|---|
| Display Size | Graphical two line display, 192*48 Pixel | Graphical display, 3,7 inch, 240*120 Pixel | Graphical color display, 4,3 inch, 480*272 Pixel |
| Display Color | Monochrome | Monochrome | Colored, 16 bit color depth |
| Backlight | No | Yes | Yes |
| Adjustable | No | Yes | Yes | see Fig. 15

OpenScape Desk Phone CP600 with Key Modul see Fig. 16

Key Module KM400 see Fig. 17

Keymodul KM600

Annex 1

| Additional optical alert | Yes (red/green/orange) | Yes (red/green/orange) | Yes (red/green/orange) |

Keys/LED

| Feature | OpenScape Desk Phone CP 200 | OpenScape Desk Phone CP 400 | OpenScape Desk Phone CP 600 |
| --- | --- | --- | --- |
| Fixed function keys | 5, thereof 3 with LED; Hold, Transfer, Conference, Settings, Messages | 2; Menu, Out-of-Office | 2; Menu, Out-of-Office |
| Free programmable keys | 4 with LED (red/green/orange) | 16 with LED (red/green/orange) | None, Alternative: 4 Favorites with LED (red/green/orange) |
| Pre-programmed keys | Call Log Contacts, Call forwarding, Redial | None | None |
| Key labeling | Paper | Paper | Display |
| Audio Keys | 3 with LED; Mute, Loudspeaker, Headset and Volume +/- | | |
| Navigation | 4-Way Navigation-key and OK-Button | | |

Interfaces

| Feature | OpenScape Desk Phone CP 200 | OpenScape Desk Phone CP 400 | OpenScape Desk Phone CP 600 |
| --- | --- | --- | --- |
| LAN Connectivity | 10/100 MBit/s Ethernet autosensing | 10/100/1000 MBit/s Ethernet autosensing | 10/100/1000 MBit/s Ethernet autosensing |
| Energy Efficient Ethernet (IEEE 802.3az) | No | Yes | Yes |
| Power over Ethernet (PoE, IEEE 802.af) | Yes | | |
| PoE Class | 1 | 2 | 2 |
| Energy Saving Mode | No | Yes | Yes |
| Integrated Ethernet Switch for PC connection | Yes | | |
| LAN activity monitor for sending and receiving for both ports (part of menu) | Yes | | |
| Headset jack for wired (121 TR9-5) and wireless Headsets (121 TR9-5*) For details please click here | Yes | | |
| Bluetooth 2.1 BR/EDR: | No | No | Yes |

Annex 1

| | | | |
|---|---|---|---|
| (Headset Profile)<br>• HFP (Hands-free Profile)<br>• OPP (Object Push Profile) | | | |
| Bluetooth Low Energy 4.1 | No | No | Yes |
| External conference unit | Yes, via cable | Yes, via cable | Yes, via cable |
| Passive RFID Tag with<br>• Serial number = MAC Address<br>• Part number<br>• Manufacturing date and location | Yes | | |
| Passive NFC Tag with<br>• Bluetooth MAC Address (Bluetooth simple paring)<br>• LAN MAC Address (Mobility) | No | No | Yes |
| SD Card | No | No | Yes |
| Key Module Connector | No | Yes, up to 2 Key Modules KM400 | Yes, up to 4 Key Modules KM600 |

Applications

| Feature | OpenScape Desk Phone CP 200 | OpenScape Desk Phone CP 400 | OpenScape Desk Phone CP 600 |
|---|---|---|---|
| Telephony | Yes | | |
| Personal phone book/contacts | Yes, up to 100 | Yes, up to 1000 conversations with contact information | Yes, up to 1000 conversations with contact information |
| Local call log | Yes (optional), 30 entries for each category (dialed, received, missed, forwarded calls) | 3 per conversation, maximal 3000 | 3 per conversation, maximal 3000 |
| Picture Clip | No | No | Yes |

Annex 1

| LDAP Client for corporate directory | Yes | | |
|---|---|---|---|
| Screen saver | No | No | Yes |
| Microsoft® Exchange connector | No | Yes | Yes |
| Circuit® connector | No | Yes | Yes |
| Operating system | Linux | | |
| User Interface Language | Basque, Brazil, Bulgarian, Catalan, Croatian, Czech, Danish, Dutch, English (USA), English (UK), Estonian, Finnish, French, German, Greek, Hungarian, Indonesian (with Latin characters), Italian, Latvian, Lithuanian, Macedonian, Malayan (with Latin characters), Norwegian, Polish, Portuguese, Romanian, Russian (In Cyrillic characters), Serbian (in Latin and Cyrillic characters), Slovak, Slovenian, Swedish, Spanish, Turkish and Welsh | | |
| Admin. Language (local admin. menu/web based management) | English | | |

Technical data

| Feature | OpenScape Desk Phone CP 200 | OpenScape Desk Phone CP 400 | OpenScape Desk Phone CP 600 |
|---|---|---|---|
| Dimension<br>Angle x Height [mm] x Width [mm] x Depth [mm] | 20° x 113 x 219 x 165<br>45° x 173 x 219 x 207 | 20° x 143 x 283 x 165<br>45° x 189 x 283 x 207 | 20° x 150 x 219 x 207<br>45° x 193 x 219 x 165 |
| Weight [kg] | 1,0 | 1,2 | 1,0 |
| Wall mountable (Wall mount unit planned for future release) | Yes | No | Yes (not with Key Modul KM600) |
| Europe<br>USA/Canada | CE<br>NRTL | | |
| Safety standards | CISPR22 Class B, CISPR 24<br>EN55022 Class B, EN55024<br>FCC Part 15 (CFR 47) Class B | | |
| Hearing Aid compatibility | FCC Part 68 (CFR 47) / CS-03 Part V | | |
| Storage conditions | -40°C to +70°C | -40°C to +70°C | -40°C to +70°C |
| Operational conditions | +5°C to +70°C | +5°C to +70°C | +5°C to +70°C |
| Power supply<br>For Details, please click here Remark: The same PSUs as | Yes, optional | Yes, optional | Yes, optional; from 2nd Key Modul KM600 mandatory |

Annex 1

| OpenStage and Desk Phone IP Phones. | | | . | |
|---|---|---|---|---|

Network and protocols

| Feature | OpenScape Desk Phone CP 200 | OpenScape Desk Phone CP 400 | OpenScape Desk Phone CP 600 |
|---|---|---|---|
| IP protocols | IP V4/V6 | | |
| DHCP<br><br>• IP address<br>• Subnet mask<br>• Default route<br>• SNTP IP address<br>• Timezone offset<br>• Primary/Secondary DNS<br>• DNS Domain Name<br>• VLAN ID, DLS address (Vendor specific Information option 43) | Yes | | |
| IEEE802.1ab (LLDP-MED)<br><br>Essential parameters of the protocol:<br><br>• Send and receive VLAN ID (no need to configure the vendor specific DHCP option 43 / DLS does not need to run in the Default LAN)<br>• Send and receive Quality of Service parameter (QoS) for RTP (Media)<br>• Power consumption (Power Class) – allows a more precise configuration of the power requirements than the classification according to IEEE802.3af. | Yes | | |

Annex 1

| | |
|---|---|
| enabled network access switches. Old network access switches that don not adhere to the 802.1D-1998 MAC bridging specification might appear to be propagating the LLDP multicasts through the subnet. In this case LLDP-MED should be deactivated on the phone prior to installation. LLDP-MED is supported for the phone LAN port only and does not apply to the PC port. | |
| DNS (Host-) name for the device | Yes |
| IEEE802.1Q (VLAN tagging and prioritization) VLAN ID configuration options: <br> ▪ Manual / DLS <br> ▪ DHCP Option 43 <br> ▪ LLDP-MED | Yes |
| QoS (DIFFSERV und IEEE802.1p/q) | Yes |
| Sending of SNMP traps according to MIB II and private QDC-MIB | Yes |
| Support of QDC | Yes |

Acoustic

| Feature | OpenScape Desk Phone CP 200 | OpenScape Desk Phone CP 400 | OpenScape Desk Phone CP 600 |
|---|---|---|---|
| Codecs <br> ▪ G.711 (64 kbit/s a/u-law) <br> ▪ G.722 (64 kbit/s) <br> ▪ G.729 A/B (8 kbit/s) | Yes | | |
| G.711, G.729A/B Silence suppression (VAD) | Yes | | |
| On-hook dialing | Yes | | |
| Open listening | Yes | | |
| Full duplex hands-free speaker | Yes | | |

Annex 1

| Echo canceling for local echo (AEC) full duplex | Yes | | |
|---|---|---|---|
| Ringer (MP3) | No | Yes | Yes |
| Ringer (midi or wave) | Yes | | |
| Ringer on/off/beep | Yes | | |
| Adaptive jitter buffer | Yes | | |
| Room Character Configuration | Yes | | |
| Selectable packet size<br>■ 10 ms<br>■ 20 ms<br>■ 30 ms<br>■ 60ms<br>■ auto | Yes | | |
| DTMF inband | Yes | | |
| DTMF RFC4833 | Yes | | |

Administration

| Feature | OpenScape Desk Phone CP 200 | OpenScape Desk Phone CP 400 | OpenScape Desk Phone CP 600 |
|---|---|---|---|
| Installation via Plug&Play<br><br>Requires DLS or DLS-WPI<br>■ based on MAC address<br>■ based on E.164 number<br>■ Secure PIN Mode supported | Yes | | |
| Remote admin via DLS | Yes | | |
| Admin via local phone menu (password protected) | Yes | | |
| Remote admin via phone Web-Server for user and admin | Yes | | |

Annex 1

| | |
|---|---|
| protected) | |
| Software-Download via Browser, FTP and HTTPS | Yes |
| Trace and Debug capabilities | Yes |

Security

| Feature | OpenScape Desk Phone CP 200 | OpenScape Desk Phone CP 400 | OpenScape Desk Phone CP 600 |
|---|---|---|---|
| Signaling Encryption (TLS) | Yes | | |
| RFC5746: TLS Renegotiation Indication Extension | Yes | | |
| Payload Encryption (SRTP, DTLS-SRTP) | Yes | | |
| HTTPS<br>■ DLS Interface with Secure PIN Mode<br>■ Web Server<br>■ File download | Yes | | |
| Certificate download DLS (X.509 V3) | Yes | | |
| OCSP Check (Online Certificate Status Protocol) | Yes | | |
| Certificate verification<br>■ DLS Interface with secure PIN mode<br>■ Web Server<br>■ File download | Yes | | |
| IEEE 802.1x supplicant | Yes | | |

Annex 1

| PEAP) | |
|---|---|
| SSH access (configurable) | Yes |

Connectable Devices

The OpenScape Desk Phone CP can be connected to the following systems:

- OpenScape Voice V7R1, V8 and V9

For details please click here

Order Information

| Feature | OpenScape Desk Phone CP 200 | OpenScape Desk Phone CP 400 | OpenScape Desk Phone CP 600 | OpenScape Key Module 400 | OpenScape Key Module 600 |
|---|---|---|---|---|---|
| Package content | Phone, handset and cord, Paper label and cover, Stand, Installations- and Quick Reference Guide | Phone, handset and cord, Paper label and cover, Stand, Installations- and Quick Reference Guide | Phone, handset and cord, Stand, Installations- and Quick Reference Guide | Key Module, Paper label and cover, Stand | Key Module, Stand |
| Feature Number | L30250-F600-C426 | L30250-F600-C427 | L30250-F600-C428 | L30250-F600-C429 | L30250-F600-C430 |
| Part Number | S30817-S7720-A101 | S30817-S7722-A101 | S30817-S7724-A101 | S30817-S7726-A101 | S30817-S7728-A101 |

Power Supply Units, please see here
Remark: The same PSUs as already been used for OpenStage and Desk Phone IP Phones.

Accessories

This sub-page shows the accessories which are provided for the OpenScape Desk Phone CP phones, those are for instance headsets. For Accessories, please look here

Documentation and Training

Information

- OpenScape Desk Phone CP Datenblatt
- OpenScape Desk Phone CP Data Sheet
- OpenScape Desk Phone CP Portfolio Brochure
- Product pictures, please look here
- Declaration of Conformity (DoC), please look here Documentation English

- OpenScape Desk Phone CP200 400 600 SIP, Administrator Documentation
- OpenScape Desk Phone CP200 SIP, User Guide
- OpenScape Desk Phone CP200 SIP, Quick Reference Guide
- OpenScape Desk Phone CP400 SIP, User Guide
- OpenScape Desk Phone CP400 SIP, Quick Reference Guide
- OpenScape Desk Phone CP600 SIP, User Guide
- OpenScape Desk Phone CP600 SIP, Quick Reference Guide Deutsch

- OpenScape Desk Phone CP200 SIP, Bedienungsanleitung
- OpenScape Desk Phone CP200 SIP, Kurzbedienungsanleitung
- OpenScape Desk Phone CP400 SIP, Bedienungsanleitung
- OpenScape Desk Phone CP400 SIP, Kurzbedienungsanleitung
- OpenScape Desk Phone CP600 SIP, Bedienungsanleitung
- OpenScape Desk Phone CP600 SIP, Kurzbedienungsanleitung Multilingual

- OpenScape Desk Phone CP200, Installation and Quick Reference, Installationsanleitung
- OpenScape Desk Phone CP400, Installation and Quick Reference, Installationsanleitung
- OpenScape Desk Phone CP600, Installation and Quick Reference, Installationsanleitung

Key Labeling Tool

Annex 1

Training

English

- OpenScape Desk Phone CP Family - Sales Training (ODPCPFMSDV) (https://academy.unify.com/enweb/beschreibung1.jsp?Course=BAACKXV)

Remark: For participation and booking a myTraining-Account is required.

Deutsch

- OpenScape Desk Phone CP Familie - Vertriebs-Training (ODPCPFMSDV) (https://academy.unify.com/enweb/beschreibung1.jsp?Course=BAACLBM)

Hinweis: Für die Teilnahme und Buchung benötigen Sie einen myTraining-Account.

Firmware / Software

> The SIP firmware provides encryption capabilities. Hence its distribution must follow legal requirements which do not allow unrestricted SW distribution via the Internet. The firmware is only provided by Unify technicians or by official Unify Partners. Customers with self-care contracts will have access to SW within the SEBA (https://enterprise-businessarea.unify.com) Web portal (login required).

The Application software of the OpenScape Desk Phone CP phones can be transferred to the phone:

- using FTP or HTTPS method.
- using Deployment Service.
- using WBM phone interface.

Mass deployment

See Mass Deployment.

End User License Agreement (EULA) for Open Source Software

The OpenScape Desk Phone CP phones use Open Source Software. The model specific end user license agreement (EULA) and License terms can be found in the following list:

| Model | SIP V1R0 |
|---|---|
| OpenScape Desk Phone CP200 | OS CP200 EULA<br>OS CP200 License term |
| OpenScape Desk Phone CP400 and CP600 | OS CP400 and CP600 EULA<br>OS CP400 and CP600 License term |

Open Source Software used in the product

The Open Source Software can be downloaded from the OpenScape Desk Phone CP Open Source Software V1 page.

Contact us

- US: New! OpenScape Desk Phone CP Family (http://go.unify.com/openscape_phone_US)
- UK: New! OpenScape Desk Phone CP Family (http://go.unify.com/openscape_phone_UK)
- DE: Neu! OpenScape Desk Phone CP Produktfamilie (http://go.unify.com/openscape_phone_DE)
- BRA: New! Linha OpenScape Desk Phone CP (http://go.unify.com/openscape_phone_BP)

See also

OpenScape Desk Phone CP Frequent Asked Questions (FAQs)

- sub-page provides additional information to the OpenScape Desk Phone CP phones

OpenScape Desk Phone power supply and PoE classes

- sub-page provides required power supply and PoE classes of phones and accessories

- Devices
- OpenScape Voice

Annex 2

Go gle  Display this page in: German  Translate  Deactivate for: English  Options ▼

Harmonize

Experts Wiki

- Home
- Devices
- Communications Systems
- Unified Communications
- Developer Program Search          Go  Search

Revision history of "OpenScape Desk Phone CP (SIP)"

View logs for this page

| Browse history | | | |
|---|---|---|---|
| From year (and earlier): | From month (and earlier): all | ☐ Deleted only | Go |

Diff selection: Mark the radio boxes of the revisions to compare and hit enter or the button at the bottom.
Legend: (cur) = difference with latest revision, (prev) = difference with preceding revision, m = minor edit.

(Latest | Earliest) View (newer 50 | older 50) (20 | 50 | 100 | 250 | 500)
Compare selected revisions

- (cur | prev)   09:18, 8 July 2016 Haidar (Talk | contribs) .. (30,315 bytes) (+5)
- (cur | prev)   08:45, 8 July 2016 Horemu (Talk | contribs) .. (30,310 bytes) (-1) .. (→Contact us)
- (cur | prev)   16:29, 7 July 2016 Haidar (Talk | contribs) .. (30,311 bytes) (-8)
- (cur | prev)   16:24, 7 July 2016 Haidar (Talk | contribs) .. (30,319 bytes) (+9)
- (cur | prev)   15:00, 7 July 2016 Haidar (Talk | contribs) .. (30,310 bytes) (+223)
- (cur | prev)   11:27, 24 June 2016 Haidar (Talk | contribs) .. (30,087 bytes) (+106)
- (cur | prev)   13:08, 22 June 2016 Haidar (Talk | contribs) .. (29,981 bytes) (+334)
- (cur | prev)   15:13, 15 June 2016 Haidar (Talk | contribs) .. (29,647 bytes) (+179)
- (cur | prev)   10:44, 8 June 2016 Haidar (Talk | contribs) .. (29,468 bytes) (+97)
- (cur | prev)   10:41, 8 June 2016 Haidar (Talk | contribs) .. (29,371 bytes) (+83)
- (cur | prev)   10:01, 8 June 2016 Haidar (Talk | contribs) .. (29,288 bytes) (-8)
- (cur | prev)   08:39, 30 May 2016 Haidar (Talk | contribs) .. (29,296 bytes) (+261)
- (cur | prev)   13:52, 23 May 2016 Haidar (Talk | contribs) .. (29,035 bytes) (-8)
- (cur | prev)   13:47, 23 May 2016 Haidar (Talk | contribs) .. (29,043 bytes) (+351)
- (cur | prev)   16:47, 19 May 2016 Haidar (Talk | contribs) .. (28,692 bytes) (+64)
- (cur | prev)   16:10, 19 May 2016 Haidar (Talk | contribs) .. (28,628 bytes) (+13)
- (cur | prev)   12:31, 18 May 2016 Haidar (Talk | contribs) .. (28,615 bytes) (+364)
- (cur | prev)   17:10, 13 May 2016 Hans.zeiner (Talk | contribs) m .. (28,251 bytes) (0) .. (→End User License Agreement (EULA) for Open Source Software)
- (cur | prev)   14:09, 12 May 2016 Haidar (Talk | contribs) .. (28,251 bytes) (+36)
- (cur | prev)   16:41, 11 May 2016 Haidar (Talk | contribs) .. (28,215 bytes) (+24)
- (cur | prev)   09:49, 9 May 2016 Jan Sychra (Talk | contribs) .. (28,191 bytes) (-4) .. (→Open Source Software used in the product)
- (cur | prev)   13:08, 4 May 2016 Jan Sychra (Talk | contribs) .. (28,195 bytes) (+6) .. (→End User License Agreement (EULA) for Open Source Software)
- (cur | prev)   16:45, 3 May 2016 Haidar (Talk | contribs) .. (28,189 bytes) (+193)
- (cur | prev)   16:16, 3 May 2016 Haidar (Talk | contribs) .. (27,996 bytes) (+234)
- (cur | prev)   13:26, 3 May 2016 Haidar (Talk | contribs) .. (27,762 bytes) (+223)
- (cur | prev)   13:08, 3 May 2016 Haidar (Talk | contribs) .. (27,539 bytes) (+56)
- (cur | prev)   13:01, 3 May 2016 Haidar (Talk | contribs) .. (27,483 bytes) (+100)
- (cur | prev)   12:55, 3 May 2016 Haidar (Talk | contribs) .. (27,383 bytes) (-23)
- (cur | prev)   12:49, 3 May 2016 Haidar (Talk | contribs) .. (27,406 bytes) (+236)
- (cur | prev)   09:04, 3 May 2016 Haidar (Talk | contribs) .. (27,170 bytes) (0)
- (cur | prev)   15:28, 2 May 2016 Haidar (Talk | contribs) .. (27,170 bytes) (+24)
- (cur | prev)   15:25, 2 May 2016 Haidar (Talk | contribs) .. (27,146 bytes) (+2,160)
- (cur | prev)   13:07, 2 May 2016 Haidar (Talk | contribs) .. (24,986 bytes) (-1,122)
- (cur | prev)   14:53, 29 April 2016 Haidar (Talk | contribs) .. (26,108 bytes) (-12)
- (cur | prev)   14:24, 29 April 2016 Jan Sychra (Talk | contribs) .. (26,120 bytes) (+9) .. (→Open Source Software used in the product)
- (cur | prev)   13:18, 29 April 2016 Haidar (Talk | contribs) .. (26,111 bytes) (0)
- (cur | prev)   12:34, 27 April 2016 Haidar (Talk | contribs) .. (26,111 bytes) (+1)
- (cur | prev)   12:33, 27 April 2016 Haidar (Talk | contribs) .. (26,110 bytes) (+894)
- (cur | prev)   10:52, 27 April 2016 Haidar (Talk | contribs) .. (25,216 bytes) (+208)

Annex 2

- (cur | prev)  11:08, 25 April 2016 Haidar (Talk | contribs) . . (24,792 bytes) (-2)
- (cur | prev)  15:08, 22 April 2016 Haidar (Talk | contribs) . . (24,794 bytes) (-15)
- (cur | prev)  15:05, 22 April 2016 Haidar (Talk | contribs) . . (24,809 bytes) (-83)
- (cur | prev)  14:58, 22 April 2016 Haidar (Talk | contribs) . . (24,892 bytes) (+266)
- (cur | prev)  13:19, 22 April 2016 Haidar (Talk | contribs) . . (24,626 bytes) (+604)
- (cur | prev)  11:27, 22 April 2016 Haidar (Talk | contribs) . . (24,022 bytes) (-93)
- (cur | prev)  10:50, 22 April 2016 Haidar (Talk | contribs) . . (24,115 bytes) (+2)
- (cur | prev)  16:21, 21 April 2016 Haidar (Talk | contribs) . . (24,113 bytes) (+1,822)
- (cur | prev)  15:21, 21 April 2016 Haidar (Talk | contribs) . . (22,291 bytes) (+310)
- (cur | prev)  14:51, 21 April 2016 Haidar (Talk | contribs) . . (21,981 bytes) (+5,224)

Compare selected revisions
(Latest | Earliest) View (newer 50 | older 50) (20 | 50 | 100 | 250 | 500)

What is claimed is:

1. A method for providing a unified interface for a plurality of network-connected devices, each one of the network-connected devices having a device-specific interface, the method being performed by a selected one of the devices, the method comprising:
transmitting a media message, wherein the transmitting includes receiving a media message from a contact or sending the media message to a contact;
based on the transmitting of the media message, creating a new conversation item, wherein the new conversation item comprises contact information for the media message and media message transmission information;
searching a conversation list, having conversation history records, to identify a matching conversation history record;
adding the new conversation item to the matching conversation history record;
adding the matching conversation history record to the conversation list;
communicating the conversation list to other ones of the plurality of network-connected devices; and
processing the conversation list using device-specific application programing interface of the selected one of the devices, to display the conversation list on a device-specific interface of the selected one of the devices.

2. The method of claim 1, wherein at least one of the network-connected devices is a desktop telephone.

3. The method of claim 2, wherein the device-specific interface for the desktop telephone is configured to allow a user to select a contact information within the conversation item via phone navigational keys, and wherein the device-specific interface is configured to allow the user to place a call using a call key after selecting the contact information.

4. The method of claim 1, wherein the media message is a telephone call, and the media message transmission information includes at least one of a duration of a call, a start time of the call, an end time of the call, a contact name, or a status of the call, and wherein the status of the call is one of an incoming received call, an outgoing send call, an incoming missed call, an outgoing missed call, or a call in progress.

5. The method of claim 1, wherein a most recent conversation item is displayed at a top of the conversation list.

6. The method of claim 1, wherein the media message is a text message, and the media message transmission information includes at least a portion of the text message.

7. The method of claim 1, wherein the media message is a text message, and the media message transmission information includes at least one of a time of the message, a contact name, or a status of the text message, and wherein the status of the text message is one of an incoming received message or an outcoming send message.

8. The method of claim 1, wherein the contact information comprises a phone number and at least a name of the contact, and wherein the contact information is obtained by first:
searching for the name of the contact in a local database associated with the selected one of the devices; and
when the name of the contact in the local database is not found:
submitting a request to search for the name of the contact in remote databases associated with other ones of the plurality of network-connected devices; and
receiving the name when the search for the name is successful.

9. The method claim 8, wherein the remote databases may include databases associated with contacts stored at a Microsoft Exchange Server or Lightweight Directory Access Protocol accessible server.

10. The method of claim 1, wherein searching a conversation list to determine if the matching conversation history record is found comprises:
searching for the matching conversation history record in a local database associated with the selected one of the devices; and
when the matching conversation history record is not found:
submitting a request to search for the matching conversation history record in remote databases associated with other ones of the plurality of network-connected devices; and
receiving the conversation history record when the search for the conversation history record is successful.

11. The method of claim 1, wherein for each conversation item there is an associated display element for an action, wherein the action may be executed via a button or a graphical user interface, and wherein the action includes at least one of calling a contact number associated with the conversation item, hanging up a call, or showing details of a call.

12. The method of claim 1, wherein for the conversation list there is an associated display element for an action, wherein the action may be executed via a button or a graphical user interface, and wherein the action includes searching the conversation list.

13. The method of claim 12, wherein the conversation list is displayed on a touch screen, and wherein the action is executed by touching the display element.

14. The method of claim 1, wherein when the matching conversation history record is not found:
creating a new conversation history record; and
adding the new conversation item to the new conversation history record.

15. A system for providing a unified interface for a plurality of network-connected devices, each one of the network-connected devices having a device-specific interface, the system including at least one processor configured to execute operations for updating a conversation list, the operations comprising:
transmitting a media message, wherein the transmitting includes receiving a media message from a contact or sending the media message to a contact;
based on the transmitting the media message, creating a new conversation item, wherein the new conversation item comprises media message transmission information;
searching the conversation list having conversation history records to identify a matching conversation history record;
adding the new conversation item to the matching conversation history record;
adding the matching conversation history record to the conversation list;
communicating the conversation list to the plurality of network-connected devices.

16. The system of claim 15 being a distributed system having a plurality of processors associated with the plurality of the network-connected devices, wherein each one of the processors is configured to update the conversation list and to communicate the updated conversation list to other network-connected devices.

17. The system of claim 16, wherein at least one of the network-connected devices is a desktop telephone.

18. The system of claim 17, wherein the media message is a telephone call, and the media message transmission information includes at least one of a duration of a call, a start time of the call, an end time of the call, a contact name, or a status of the call, and wherein the status of the call is one of an incoming received call, an outgoing send call, an incoming missed call, an outgoing missed call, or a call in progress.

19. The system of claim 17, wherein the media message transmission information comprises a phone number and at least a name of the contact, and wherein the contact information is obtained by:
  searching for the name of the contact in a local database associated with the at least one processor; and
  when the name of the contact is not found in the local database:
    submitting a request to search for the name of the contact in remote databases; and
    receiving the name when the search for the name is successful.

20. The system of claim 17, wherein searching the conversation list having conversation history records to identify a matching conversation history record comprises:
  searching for the matching conversation history record in a local database associated with the selected one of the devices; and
  when the matching conversation history record is not found:
    submitting a request to search for the matching conversation history record in remote databases; and
    receiving the conversation history record when the search for the conversation history record is successful.

21. The system of claim 17, wherein each one of the devices-specific interfaces for the network-connected devices includes a display screen for displaying the conversation list.

* * * * *